(12) United States Patent
Chang

(10) Patent No.: US 6,765,949 B2
(45) Date of Patent: Jul. 20, 2004

(54) CARBON NANOSTRUCTURES AND METHODS OF PREPARATION

(76) Inventor: Robert P. H. Chang, 2330 Iroquois Dr., Glenview, IL (US) 60025

( * ) Notice: Subject to any disclaimer, the term of this patent is extended or adjusted under 35 U.S.C. 154(b) by 0 days.

(21) Appl. No.: 10/231,925

(22) Filed: Aug. 29, 2002

(65) Prior Publication Data

US 2004/0052289 A1 Mar. 18, 2004

Related U.S. Application Data

(63) Continuation of application No. PCT/US01/07237, filed on Mar. 7, 2001.
(60) Provisional application No. 60/187,579, filed on Mar. 7, 2000.

(51) Int. Cl.[7] .......................... H05B 11/00; C01B 31/00
(52) U.S. Cl. .......................... 373/2; 373/62; 204/173
(58) Field of Search .................. 373/2, 111–112, 373/60, 62, 61, 66, 68–70, 41; 204/173; 423/447.3

(56) References Cited

U.S. PATENT DOCUMENTS

| 5,482,601 | A | | 1/1996 | Ohshima et al. | 207/173 |
|---|---|---|---|---|---|
| 5,877,110 | A | | 3/1999 | Snyder et al. | 502/180 |
| 5,916,642 | A | | 6/1999 | Chang | 427/580 |
| 6,537,515 | B1 | * | 3/2003 | Baker et al. | 423/447.3 |

* cited by examiner

*Primary Examiner*—Tu Ba Hoang
(74) *Attorney, Agent, or Firm*—Winston & Strawn LLP

(57) ABSTRACT

An electric arc furnace and method for forming tubular carbon nanostructures comprising a first electrode (cathode) and an a second electrode (anode) opposite the first electrode, sources of voltage (V) and current (A) to create charged particles (Ie) and produce an arch between the electrodes, a source of a gas to surround the arc, and a source of carbon precursor positioned adjacent the anode and within the arc, wherein the arc is maintained at a pressure and high temperature for a time sufficient to heat the carbon precursor to form carbon nonotubes upon the anode.

33 Claims, 36 Drawing Sheets

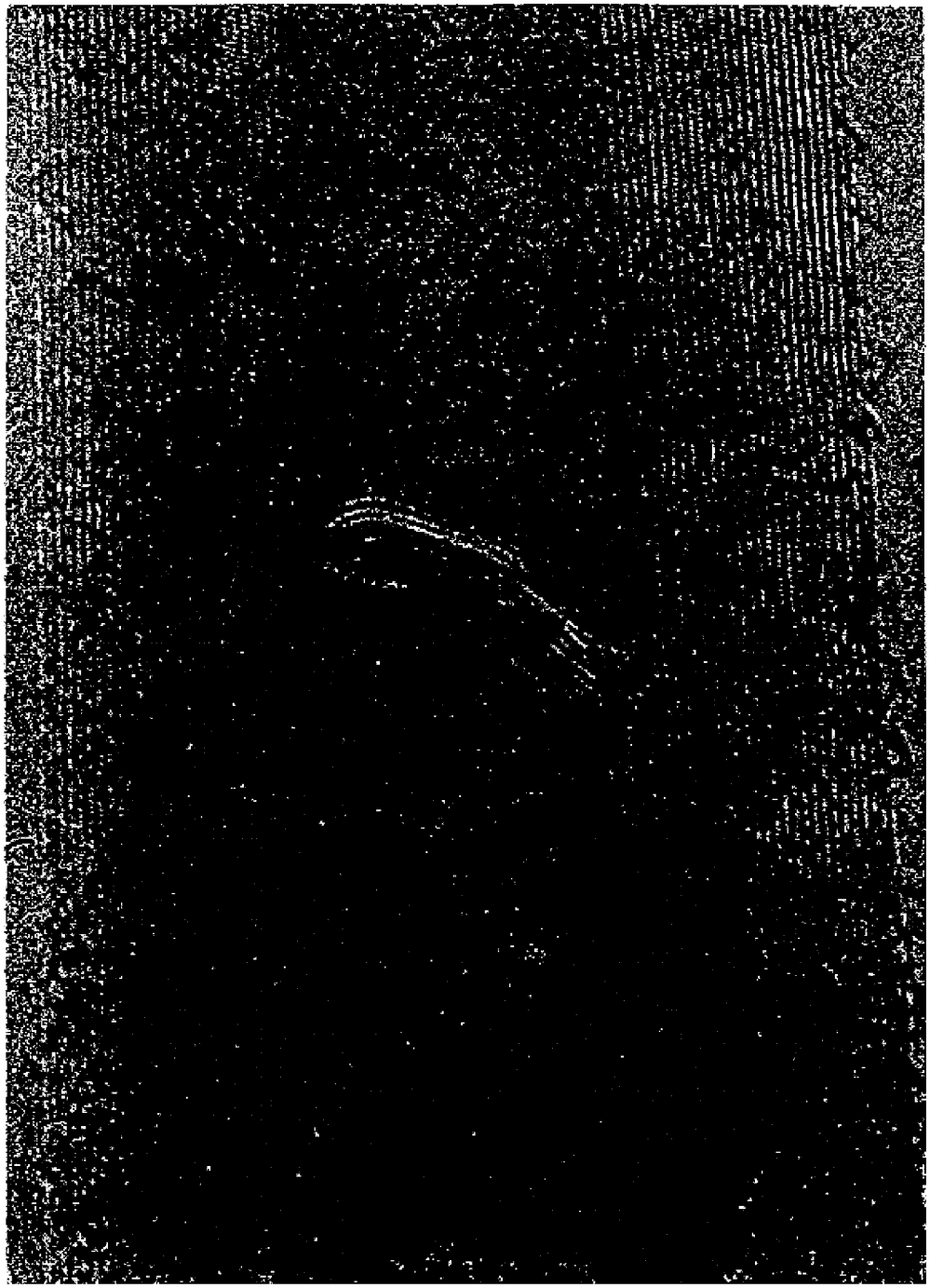
FIG. IC

NANOTUBE LAYER-TUNGSTEN ANODE

FIG. 11A
ATMOSPHERIC PRESSURE OF He, CB IN GRAPHITE ANODE
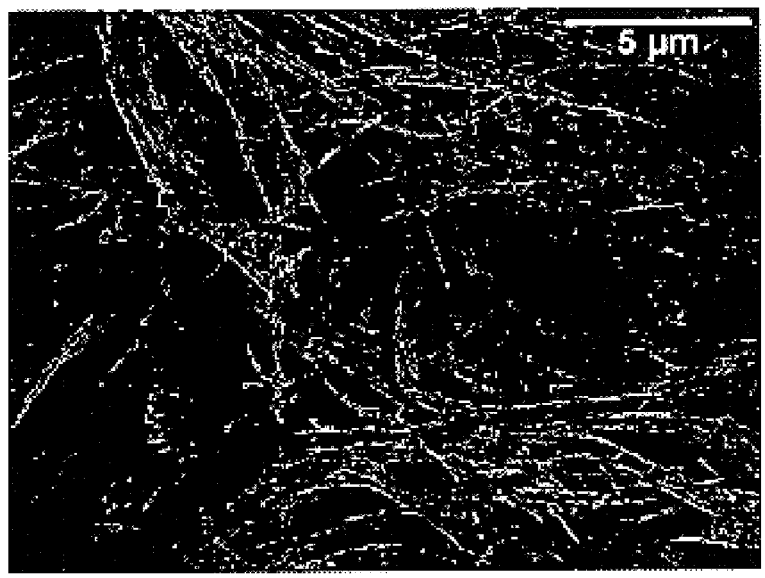
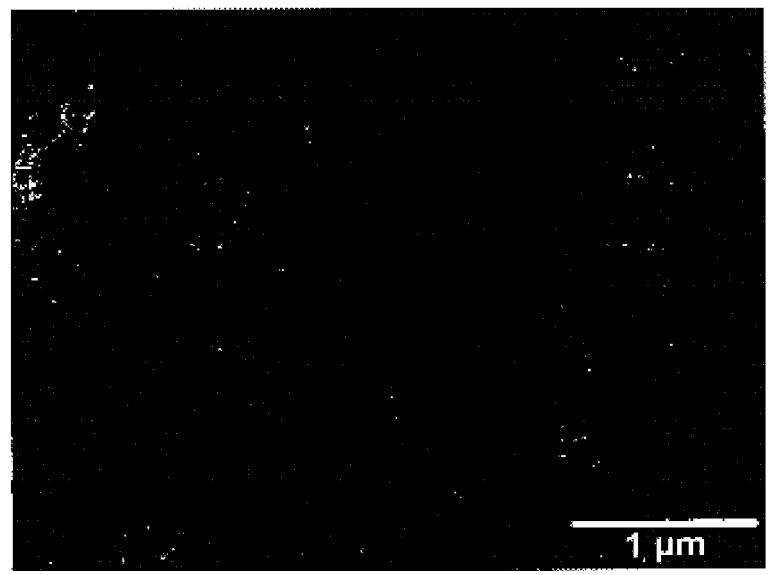
ATMOSPHERIC PRESSURE OF He, CB IN GRAPHITE ANODE
FIG. 11B

PVC CARBON IN GRAPHITE ANODE

2 HOLE GRAPHITE ANODE: WITH CB IN ONE, AND 1:1 CB AND GRAPHITE IN THE OTHER

CARBON NANOSTRUCTURES AND METHODS OF PREPARATION

This application is a continuation of the U.S. National Stage designation of International Application PCT/US01/07237 filed Mar. 7, 2001, the content of which is expressly incorporated herein by reference thereto. This application also claims the benefit of provisional application 60/187,579, filed Mar. 7, 2000.

The United States government has rights in this invention pursuant to Grant Nos. DMR9703669 and DMR9632472 from the National Science Foundation, to Northwestern University.

BACKGROUND OF THE INVENTION

Since the discovery of carbon nanotubes (S. Iijima, Nature 354, 56 (1991); T. W. Ebbesen and P. M. Ajayan, Nature 358, 220 (1992)) there have been many applications for such materials. Their size and high aspect ratios leads to possible use as electron emitters for flat panel displays (Q. H. Wang, A. A. Setlur, J. M. Lauerhaas, J. Y. Dai, E. W. Seelig, and R. P. H. Chang, Appl. Phys. Lett. 72, 2912 (1998)) and AFM/STM probes. (H. Dai, J. H. Hafner, A. G. Rinzler, D. T. Colbert, and R. E. Smalley, Nature 384, 147 (1996).) In addition, the reduced number of defects in nanotubes could make them the ultimate carbon fiber in terms of strength and stiffness. (M. M. J. Treacy, J. M. Gibson, and T. W. Ebbesen, Nature 381, 678 (1996); E. W. Wong, P. E. Sheehan, and C. M. Lieber, Science 277, 1971 (1997).)

CARBON NANOTUBES

Carbon tubules and related nanostructures are typically prepared using standard arc-discharge techniques. Generally, the discharge is in a reaction vessel through which an inert gas flows at a controlled pressure. The potential, either direct or alternating current, is applied between two graphite electrodes in the vessel. As the electrodes are brought closer together, a discharge appears resulting in plasma formation. As the anode is consumed, a carbonaceous deposit forms on the cathode, a deposit that under the proper conditions contains the desired carbon nanotubules.

However, conventional methods of making multi-walled nanotubes via arc discharge do not easily lend themselves to large scale production. (D. T. Colbert, J. Zhang, S. M. McClure, P. Nikolaev, Z. Chen, J. H. Hafner, D. W. Owens, P. G. Kotula, C. B. Carter, J. H. Weaver, A. G. Rinzler, and R. E. Smalley, Science 266, 1218 (1994).)

A variation of this general synthetic procedure is reflected in U.S. Pat. No. 5,482,601, wherein carbon nanotubes are produced by successively repositioning an axially extending a graphite anode relative to a cathode surface, while impressing a direct current voltage therebetween, so that an arc discharge occurs with the simultaneous formation of carbon nanotubes as part of carbonaceous deposits on the various portions of the cathode surface. The deposits are then scraped to collect the nanotubes. The anode must be repositioned respective to the cathode, repeatedly, to provide larger quantities of the desired nanotube product.

Related technology is described in U.S. Pat. No. 5,877,110 whereby carbon fibrils are prepared by contacting a metal catalyst with a carbon-containing gas. The fibrils can be prepared continuously by bringing the reactor to reaction temperature, adding metal catalyst particles, then continuously contacting the catalyst with a carbon-containing gas. Various complexities relating to feed rates, competing side reactions and product purity, among others, tend to detract from the wide-spread applicability and acceptance of this approach.

At low temperatures, namely below 1500° C. processes currently used in chemical vapor deposition syntheses of carbon nanotubes require metal catalysts such as iron, nickel or cobalt. This approach necessitates an additional chemical-processing step to remove the metal particle catalysts. In so doing, defects are generated in the carbon nanotubes.

It is possible to make spherical or polyhedral graphitic nanoparticles like those made in the carbon arc by the heat treatment of various carbon materials. (A. Oberlin, Carbon 22, 521 (1984); P. J. F. Harris and S. C. Tsang, Phil. Mag. A 76, 667 (1997); W. A. de Heer and D. Ugarte, Chem. Phys. Lett. 207, 480 (1993); P. J. F. Harris, S. C. Tsang, J. B. Claridge. M. L. H. Green, J. Chem. Soc. Faraday Trans. 90, 2799 (1994).) However, only short (<100 nm) nanotubes have been made by annealing fullerene soot. (W. A. de Heer and D. Ugarte, Chem. Phys. Lett. 207, 480 (1993); P. J. F. Harris, S. C. Tsang, J. B. Claridge. M. L. H. Green, J. Chem. Soc. Faraday Trans. 90, 2799 (1994).). While it is possible to scale up heat treatment methods, significant improvements need to be made in order to produce high quality nanotubes like those produced by the arc method.

GRAPHITIZATION OF CARBON

Understanding the growth mechanisms for carbon nanostructures is important as a first step towards developing new apparatus and methods for preparation. It is instructive to consider several concepts underlying graphitization in the preparation of carbon nanotubes. Graphitization begins with carbon self-diffusion, leading to order in the ab planes of graphite. (L. E. Jones and P. A. Thrower, Carbon 29, 251 (1991).) Once ordering begins to occur, graphitic regions assemble into a layered structure. In this process, defects are progressively removed from aromatic layers at higher temperatures. (L. E. Jones and P. A. Thrower, Carbon 29, 251 (1991); E. Fitzer, K. Mueller, and W. Schaefer, in *Chemistry and Physics of Carbon* (Marcel Dekker, Inc., New York, 1971), Vol. 7, p. 237; D. B. Fischbach, in *Chemistry and Physics of Carbon* (Marcel Dekker, Inc., New York, 1971), Vol. 7, Vol. 1; A. Oberlin, Carbon 22, 521 (1984); R. E. Franklin, Proc. Roy. Soc. A 209, 196 (1951); P. J. F. Harris and S. C. Tsang, Phil. Mag. A 76, 667 (1997).)

When many of the defects initially present in non-graphitizable carbons cannot be removed, extensive formation of three dimensional graphite is prevented. Consequently, graphitization of a carbon material is controlled by the initial structure of the carbon material as well as the processing conditions. (E. Fitzer, K. Mueller, and W. Schaefer, in *Chemistry and Physics of Carbon* (Marcel Dekker, Inc., New York, 1971), Vol. 7, Vol. 237; D. B. Fischbach, in *Chemistry and Physics of Carbon* (Marcel Dekker, Inc., New York, 1971), Vol. 7, Vol. 1; A. Oberlin, Carbon 22, 521 (1984); R. E. Franklin, Proc. Roy. Soc. A 209, 196 (1951); P. J. F. Harris and S. C. Tsang, Phil. Mag. A 76, 667 (1997).)

To date, there is a general consensus in the art that carbon vapor in the form of atoms, ions, or small molecules is necessary for multiwalled nanotube growth without metal catalysts. (E. G. Gamaly and T. W. Ebbesen, Phys. Rev. B 52, 2083 (1995); T. Guo, P. Nikolaev, A. G. Rinzler, D. Tomanek, D. T. Colbert, and R. E. Smalley, J. Phys. Chem. 99, 10694 (1995); J. C. Charlier, A. De Vita, X. Blase, and R. Car, Science 275, 646 (1997); Y. K. Kwon, Y. H. Lee, S.

G. Kim, P. Jund, D. Tomanek, and R. E. Smalley, Phys. Rev. Lett. 79, 2065 (1997); M. Buongiorno Nardelli, C. Roland, J. Bemhole, Chem. Phys. Lett. 296, 471 (1998).) It has also been proposed that ordered, graphitic precursors are essential for nanotube growth. (J. M. Lauerhaas, J. Y. Dai, A. A. Setlur, and R. P. H. Chang, J. Mater. Res. 12, 1536 (1997).) The complexity of the arc process makes it very difficult to study the formation of these materials or draw any conclusions regarding conditions necessary to maximize optimal growth and/or yield.

Accordingly, there is still a need in the art of manufacturing tubular carbon nanostructures, such as carbon nanotubes, for processes and apparatus therefor, which can provide carbon nanotubes essentially free of carbon overcoat, free of any metal catalysts, and generally free of defects caused by removal of catalytic materials usually present in carbon nanotubes prepared by chemical vapor deposition processes.

There are a considerable number of problems and deficiencies associated with carbon nanostructures of the prior art, with most such shortcomings resulting from the current methods of preparation. There is a demonstrated need for innovative methods of preparation so as to provide such compositions in high yield, at large scale and with the desired mechanical, structural and performance properties.

OBJECTS OF THE INVENTION

Accordingly, it is an object of the present invention to provide various methods and/or apparatus, which can be used in the preparation of carbon nanostructures, thereby overcoming the problems, deficiencies and shortcomings of the prior art, including those outlined above. It will be understood by those skilled in that the art that one or more aspects of this invention can meet certain objectives, while one or more other aspects can meet certain other objectives. Each objective may not apply equally, in all instances, to every aspect of this invention. As such, the following objects can be viewed in the alternative with respect to any one aspect of the present invention.

It can also be an object of the present invention to provide a method of using solid disordered carbon materials in the preparation of multi-walled carbon tubes and/or hollow, tube-like structures of nanometer dimension.

It can also be an object of the present invention to provide a method of using a disordered carbon material, and/or by utilizing techniques and processes analogous to graphitization.

It can also be an object of the present invention to provide a disordered carbon material as a source of pentagonal carbon and/or polyhedral structure enroute to the preparation of various tubular carbon nanostructures.

It can also be an object of the present invention to provide a method of preparing carbon nanotubes under conditions not conducive to carbon sublimation and/or substantially without the use of carbon vapor.

It can also be an object of the present invention to provide a method for preparation of carbon nanostructures of the type described herein, having enhanced and/or superior structural or mechanical properties, including but not limited to overall length and strength.

It can also be an object of one present invention to prepare carbon nanostructures of lengths exceeding those now available through the prior art, including lengths up to and greater than 0.5 $\mu$m, through choice of carbon precursor and/or process conditions, none of which would be evident, suggested or taught by the prior art.

It can also be an object of the present invention to provide a method of using temperature, heating rate and/or related process kinetics to control the growth, development and/or structure of carbon nanotubes and/or tubular structures.

It can also be an object of the present invention to provide a method of promoting open-ended growth of carbon nanocompositions, so as to enhance various mechanical or performance properties of the resulting structures.

It can also be an object of the present invention to provide an apparatus to effect one or more of the objects presented herein, as well as to increase the yield and/or production rate of carbon nanotubes.

It can also be an object of the present invention to provide a method and/or apparatus for the batch, continuous or semi-continuous production of carbon nanostructures, of the type described herein, and/or to optimize process conditions enroute to tubules and tube-like structures having enhanced structural, mechanical and/or performance properties.

Other objects, features, benefits and advantages of the present invention will be apparent in this summary, together with the following descriptions and examples, and will be readily apparent to those skilled in the art having knowledge of various synthetic methods, preparation of such carbon compositions and/or apparatus which can be used therewith. Such objects, features, benefits and advantages will be apparent from the above as taken in conjunction with the accompanying examples, figures, data and all reasonable inferences to be drawn therefrom.

SUMMARY OF THE INVENTION

The present invention, which addresses the needs of the prior art, provides a method of forming tubular carbon nanostructures by heating a disordered carbon precursor in the presence of a gas at a temperature and pressure sufficient to form the tubular carbon nanostructures. The tubular carbon nanostructures made by the methods of the present invention include multiwalled carbon nanotubes having an outside diameter of typically 5 to 40 nm and a length in the range of 50 to 150 [[mm]] micrometers. The method is enhanced by further adding charged particles provided by an electrical discharge between a cathode and an anode. The formation of tubular carbon nanostructures is also enhanced by including a dopant in the disordered carbon precursor. The temperature and pressure at which the methods for forming tubular carbon nanostructures are conducted must be adjusted such that they are below that which would cause sublimation of the disordered carbon precursor. The dopant is preferably amorphous boron which is added in an amount sufficient to increase the length of the tubular carbon nanostructures to greater than 0.5 microns. The disordered precursor useful in the present invention is fullerene soot, bold milled graphite, carbon black or sucrose carbon. The methods provided by the present invention are preferably conducted in the absence of any significant sources of carbon vapor. The methods of the invention further include controlling the arc-furnace temperature and the heating rate of the precursor to form multiwalled carbon nanotubes.

The methods of the present invention also include forming tubular carbon nanostructures by discharging a direct current arc between an anode and cathode, the anode, including a conducting electrode containing a carbon precursor, the discharging occurring in the presence of a gas, at a temperature and pressure such that the carbon precursor is maintained in solid phase and for a period of time sufficient to form tubular carbon nanostructures. When forming the tubular carbon nanostructure is accomplished primarily by heating, the carbon precursor is preferably non-graphitizable carbon. On the other hand, when the method includes heating the carbon precursor with electron charged particles then the preferred carbon precursor is graphitizable carbon. A non-graphitizable carbon includes fullerene soot, carbon black or sucrose carbon. Graphitizable carbon includes PVC. The methods of the present invention can be conducted at the pressure from 50 torr to atmospheric and at a temperature range from about 1500° C. to about 3500° C.

The present invention also provides an apparatus for forming tubular carbon nanostructures which is preferably an arc-furnace. The apparatus comprises a cathode, an anode opposite the cathode, a source of voltage and current in an amount sufficient to create charged particles and to produce an arc between the anode and cathode, a source of gas to surround the arc, and the source of carbon precursor positioned adjacent the anode and within the arc, such that the arc has a sufficiently high temperature and is maintained at a pressure for a time sufficient to heat the carbon precursor to form carbon nanotubes upon the anode.

The anode may have different geometries. The anode preferably has a recess positioned in the anode to receive the charged particles from the arc. In the recess of the anode the carbon precursor is received. The methods of the invention are conducted in a gaseous environment, wherein the gas is a inert gas or nitrogen. The anode may also be a platform positioned within the arc and optionally including a surface which envelopes the platform to retain the precursor therein. The platform may be further movable through the enveloping structure of the anode. The anode may also be circular platform having radial ribs, and spaces between the ribs for receiving the carbon precursor and also a recess for collecting the carbon nanotubes. The anode can also include a circular platform rotatably attached to the anode such that the platform includes a location for the carbon precursor and a recess for collecting the carbon nanotubes.

The present invention also provides an apparatus for forming tubular carbon nanostructures which includes a resistance furnace having at least one opening adapted to receive a conveyor belt. The furnace further includes a source of carbon precursor, a gas source for adjusting the pressure, a heat source sufficient for the formation of tubular carbon nanostructures at the desired pressure. The conveyor belt is operably connected to the resistance furnace and is utilized to retain the source carbon precursor in the resistance furnace for a period of time sufficient to form the tubular carbon structures. Once they have been formed the conveyor belt takes the carbon nanotubes out of the resistance furnace for delivery to a user.

BRIEF DESCRIPTION OF THE DRAWINGS

FIG. 11 shows micrographs of carbon nanotubes formed in an arc-furnace under atmospheric pressure of helium gas.

DETAILED DESCRIPTION OF THE INVENTION

As would be well known to those skilled in the art and made aware by this invention, the tubular, carbon compositions can have structures similar to those described in the prior art—sheets arranged about a longitudinal axis to provide multi-walled configurations. Examples of such structures, and of the type available through use of the present invention, are shown in the figures described herein. In particular, however, it has been shown that a scrolled arrangement is a preferred structure, one providing a variety of enhanced mechanical properties. Through the present invention, process conditions can be optimized to increase yield of the structures having the desired mechanical, structural and performance properties.

According to the present invention, the process of carbon nanotube formation can be accelerated by increasing the synthesis temperature between 1500° C. to 3500° C., doping the carbon precursors with boron to enhance diffusion, and interacting the carbon precursors with a large flux of low (in the tens of volts) energy electrons. High energy electrons help to break and reconfigure the carbon bonds in the precursors used in the synthesis process. Doping of the carbon precursors with boron enhances the synthesis of nanotubes at 2200° C.

In another embodiment, an alternate method was developed in which the furnace temperature was increased to about 3500° C. and low energy electrons were also added to enhance the process.

Figure 8A:
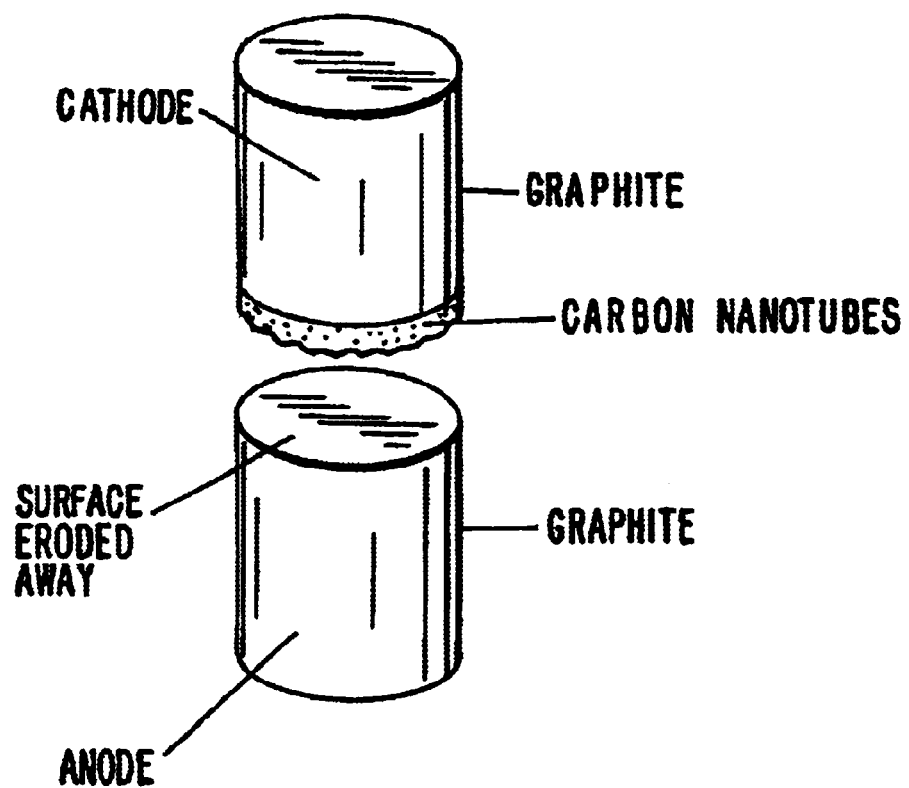
FIG. 8A is a schematic representation of an arc-furnace known in the art.
Figure 8B:
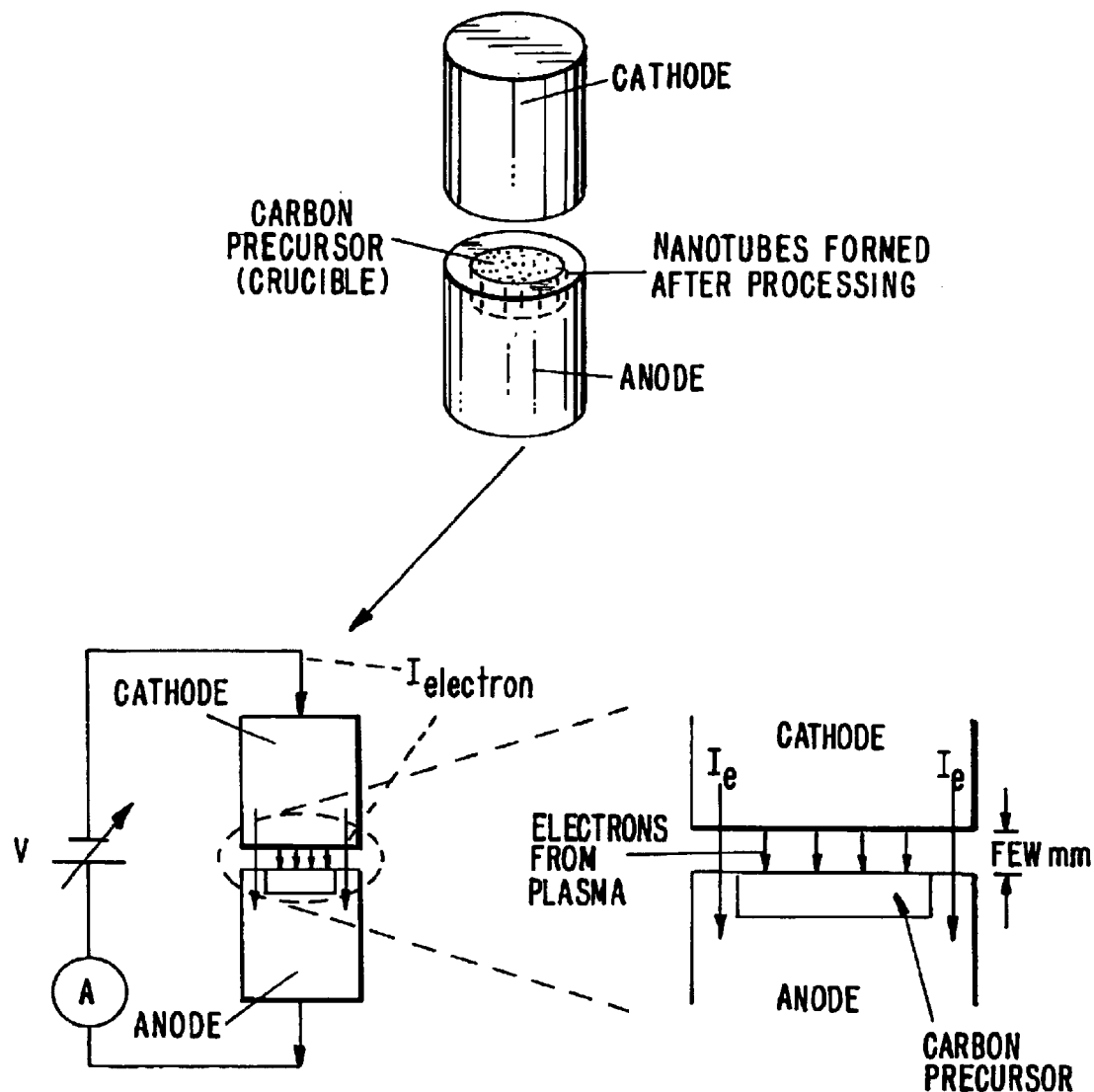
FIG. 8B is a schematic representation of an arc-furnace of the type useful with the methods of the present invention.

In the methods of Iijima, the arc electrodes are made of two graphite rods as shown in FIG. 8-a. During the operation, the anode materials are evaporated and nanotube deposits are formed on the cathode. The deposits are then scrapped off for analysis.

In the present invention an arc furnace as shown in FIG. 8-b, the anode electrode had a hole drilled to receive the carbon precursors. The rim of the anode electrode served to conduct most of the current of the arc. By operating at the right pressure range the evaporation of the carbon precursor was minimized. In addition, the arc plasma electrons were also attracted to the precursor in the "crucible" or recess of the anode. The energy of these electrons was typically a few tens electron volts, so they could help the process of making carbon nanotubes. With this electron bombardment, it was possible to use graphitizable carbon as a precursor for the formation of carbon nanotubes, as also described in Example 4 hereinbelow.

While this present invention teaches the formation of carbon nanotubes using solid state sources, it should also apply to liquid or fluidic state of the precursors. In fact, when polymeric precursors are used, with the increase of temperature the material goes through a phase transition to a glassy state. Thus, all glassy (fluidic) and solid state precursors with the presence of non-hexagonal and hexagonal structures will be useful for the purposes of the present invention.

As discussed more thoroughly in the following examples, an apparatus usable with the present invention can include an anode, graphitic or of other construction, with a recess of appropriate surface and/or volume dimension. An arc discharge between a suitable cathode structure and the anode anneals a solid carbonaceous material positioned within the recess. Larger quantities of carbon nanostructures can be prepared by increasing the recess dimension, corresponding surface area and/or the amount of carbon starting material positioned therein.

Figure 15:
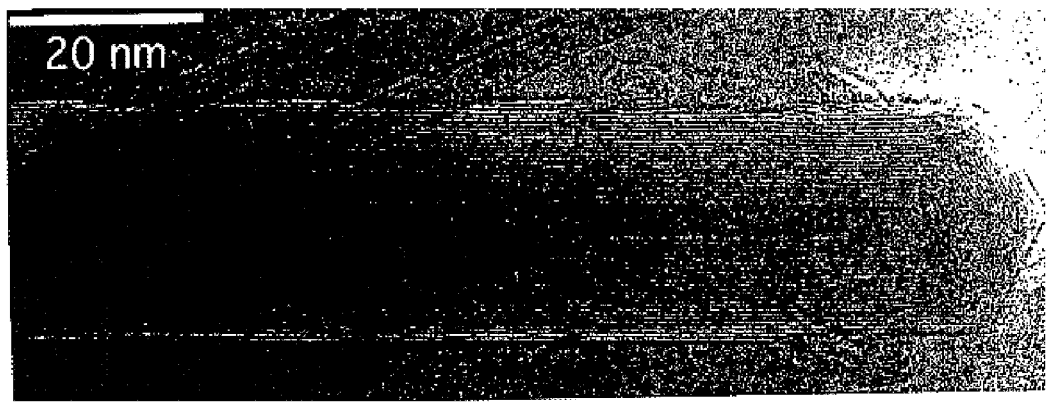
FIG. 15 is a high resolution micrograph of a section of a typical carbon nanotube made from carbon black precursor at 100 torr of helium gas and in the arc-furnace of the invention.

Properties of the carbon nanotubes obtained in the arc-furnace of the present invention have an outside diameter of typically 5 to 40 nm and a length in the range of 50 to 150 micrometer, and an aspect ratio in the range of ten thousand. The quality of the carbon nanotubes is similar to that produced by the classical arc method-very low defects, very low wall coating of carbonaceous materials as can be seen in FIG. 15. In fact, by using the methods of the invention with the addition of hydrogen gas 10–20% the carbon nanotubes are free of surface and internal carbon debris. See, for example, U.S. Pat. No. 5,916,642 to R. P. H. Chang.

The prior art has been concerned with finite geometries for plasma generation; i.e., standard electrode configurations. The present invention, however, also provides alternate geometries for apparatus to effect the methods described herein. For example, a suitable carbon precursor can be placed or contained on a surface or platform. Another surface can envelop or cup the precursor platform, whereby application of a potential between the two surfaces provides a discharge, resulting plasma and a current drawn through the precursor. Preferred embodiments for such an apparatus can include a precursor platform moveable through or within the aforementioned biased cup or enveloping structure. Sequential application of potential provides for the continuous or semi-continuous production of the desired carbon nanostructures.

For instance, through a straightforward adaptation of the apparatus described herein, various anode geometries and/or carbon precursor supports can be arranged in conjunction with a moving surface, and biased at a potential difference relative to a proximate a cathode or other such conducting geometry. Such a support might be arranged as part of a conveyor or belt, or similar such structure as would be understood by those skilled in the art. Alternatively, the cathode or equivalent structure might be positioned sequentially relative to a corresponding array of carbon starting materials. Regardless, kilogram quantities of the desired carbon nanostructures can be prepared, as described in or could be understood through the following examples.

Figure 9A:
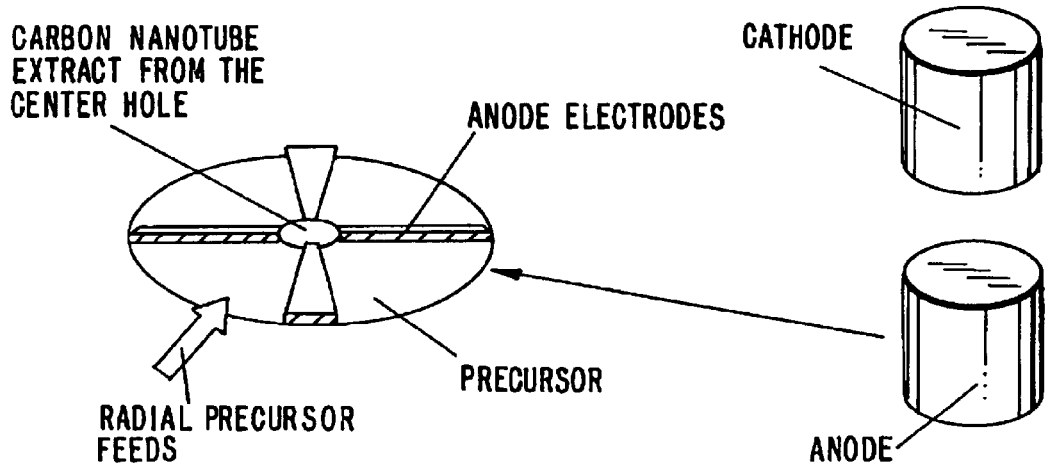
FIGS. 9A and 9B are schematic representations of an arc-furnace where the anode electrode is made of radial ribs in FIG. 9A and the anode electrode is made of spiraling-shaped ribs in FIG. 9B.
Figure 9B:
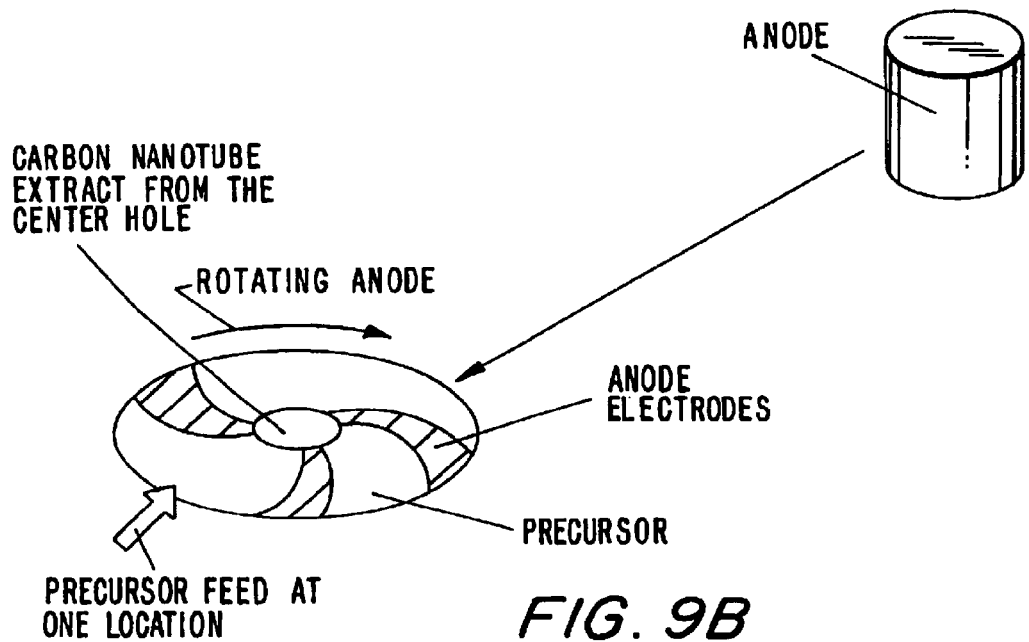

In another embodiment, the arc furnace was again made of two electrodes, each having a 10 inch diameter or larger as shown in FIG. 9-a. The anode electrode was made of radial ribs with sections in between for the radial feed of precursors. The hole in the center of the anode is the location from where the processed carbon nanotubes are extracted. In another related embodiment the anode was rotating the radial feed at one location only. In this case the anode electrode was made of spiraling shaped ribs as shown in FIG. 9-b. Again, the processed carbon nanotubes were extracted from the center recess or hole.

An arc furnace having electrodes of ⅜" diameter to 1" diameter were used to synthesize carbon nanotubes. It was found that the rate of deposition or carbon nanotubes was typically 2.5 mg/minute for 1" diameter rod. By extrapolating this rate to a ten-inch diameter electrode in a continuous feed process as described above, 360 grams/day can be obtained. However, 30% efficiency, 100 grams/day, can be produced. Thus, ten processing units can produce 1 Kg/day.

Figure 16:
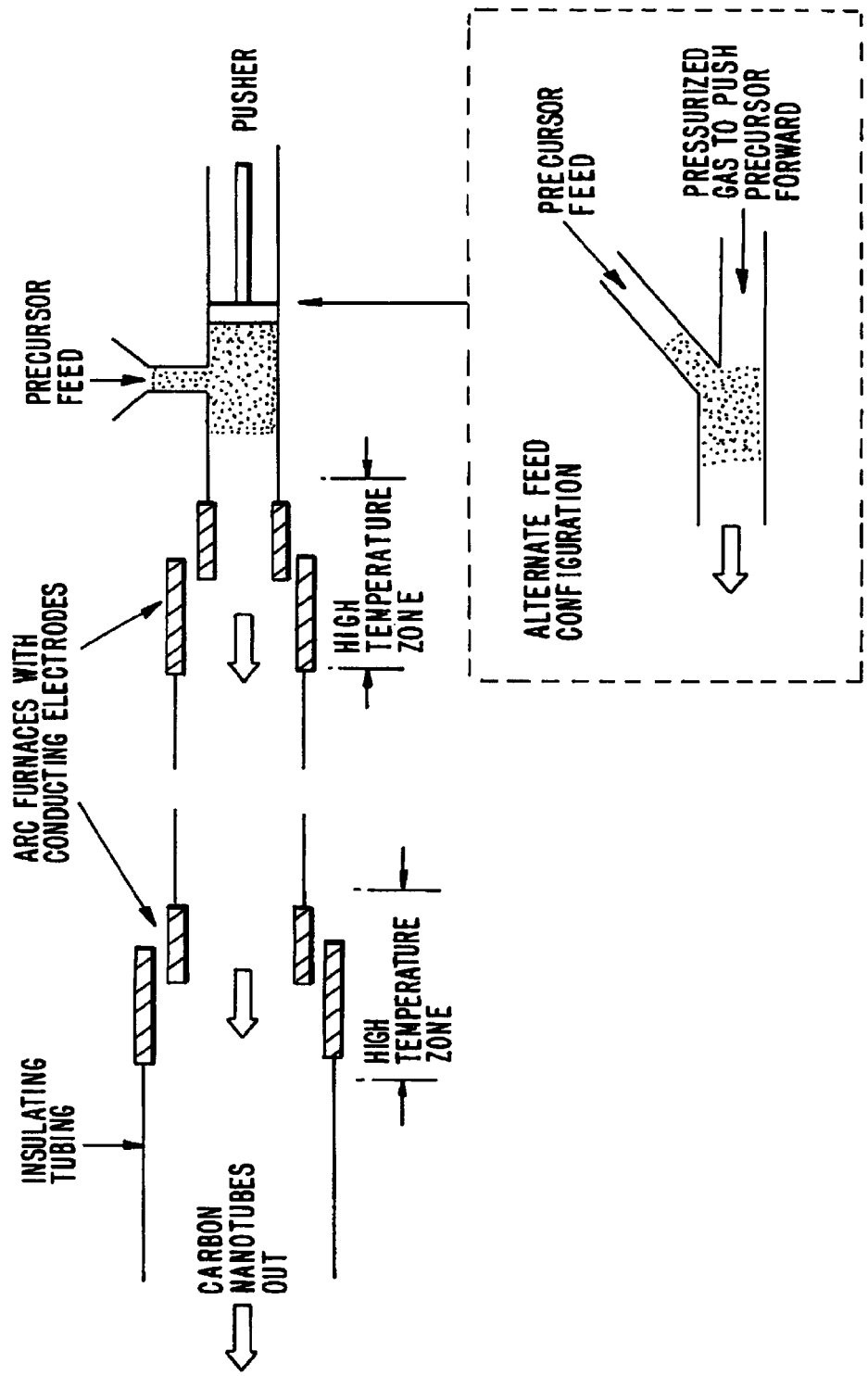
FIG. 16 is a schematic representation of a system as described in Example 12 for an alternate feed configuration.

In another aspect of the present invention, another method of synthesizing carbon nanotubes in a continuous way is provided by using the arc-furnace shown in FIG. 16. Carbon precursors are fed into a tubing which they are transported into the arc-furnace zone(s) for processing. There can be a series of arc-furnaces in tandem to improve the processing efficiency. The arc-furnace was the same as that described in Example 7 except that the electrodes are tubular and constructed of metal, for example tungsten. The arc-furnace is again powered by a direct current supply. After going through the heating zone(s), the carbon nanotubes are extracted from the opposite end. The feeding of the precursors can be by a mechanical pusher or pressurized gas.

As described elsewhere, herein, use of a dopant such as boron can alter the operative kinetics and lower the effective reaction temperature relative to heat treatment techniques. An alternate approach, also described as part of the present invention, is the interaction of charged particles with a suitable carbon precursor. As mentioned above, in the context of the prior art, an arc discharge effectively generates a high current and the requisite charged species. The resulting plasma can be used alone or in combination with a heat source to effect the desired transformation. The requisite power input that is sufficient or appropriate for the methods described herein, and as would be well-known to those skilled in the art and familiar with this invention and standard energy relationships. However, typical arc energy content and corresponding power inputs can approach 2 kilowatts/cm$^2$ and can reach or exceed 5 kilowatts/cm$^2$ as necessary or to effect the sort of transformations described herein.

The plasma conditions can be utilized alone or in combination with a heat source—ranging from radiant thermal energy to any radiation within the electromagnetic spectrum, as would be well known to those skilled in the art. The temperatures employed are generally up to about 2000° C., or as otherwise dictated by the heat resistance and functional limitations of the apparatus components. As new materials and components are devised, the operative temperature range can expand with improvements in structural integrity.

Even so, increasing temperature is a concern with respect to the source of carbon precursor. High temperatures under given pressure conditions can vaporize the precursor before reaction. Use of carbon sources, as described herein, is therefore incumbent upon consideration of competing sublimation reactions. As would be understood by those skilled in the art, a straightforward consideration of the interaction between pressure and temperature, the proper combination of reaction parameters can be chosen to effect the desired transformation-such conditions not inducing sublimation of either the carbon precursor or the resulting nanostructures.

EXAMPLES OF THE INVENTION

The following non-limiting examples and data illustrate various aspects and features relating to the compositions, apparatus and methods of this invention, including the surprising and unexpected results obtained using solid disordered carbon precursors in the preparation of structures of nanometer dimension. Comparable advantage, benefit and/or utility can be realized using various other carbon sources or other embodiments of the inventive methods and/or apparatus.

Example 1

Fullerene soot was made by the arc evaporation of graphite at 450 Torr of He, then activated in a flowing $CO_2$ atmosphere at 850° C., which increased its surface area. The soot was then mixed with varying amounts (0–20 wt%) of amorphous boron and annealed under flowing He in a graphite resistance furnace to 2200–2400° C. Boron was added to accelerate the assembly of fullerene soot by acting as a fast diffuser in the basal planes of graphite. Annealing fullerene soot without boron provided polyhedral carbon particles as in previous experiments. In comparison, analysis of the annealed fullerene soot mixed with boron showed nanotubes with length much longer than 0.5 $\mu$m (FIG. 1A).

Example 2

Figure 1A:
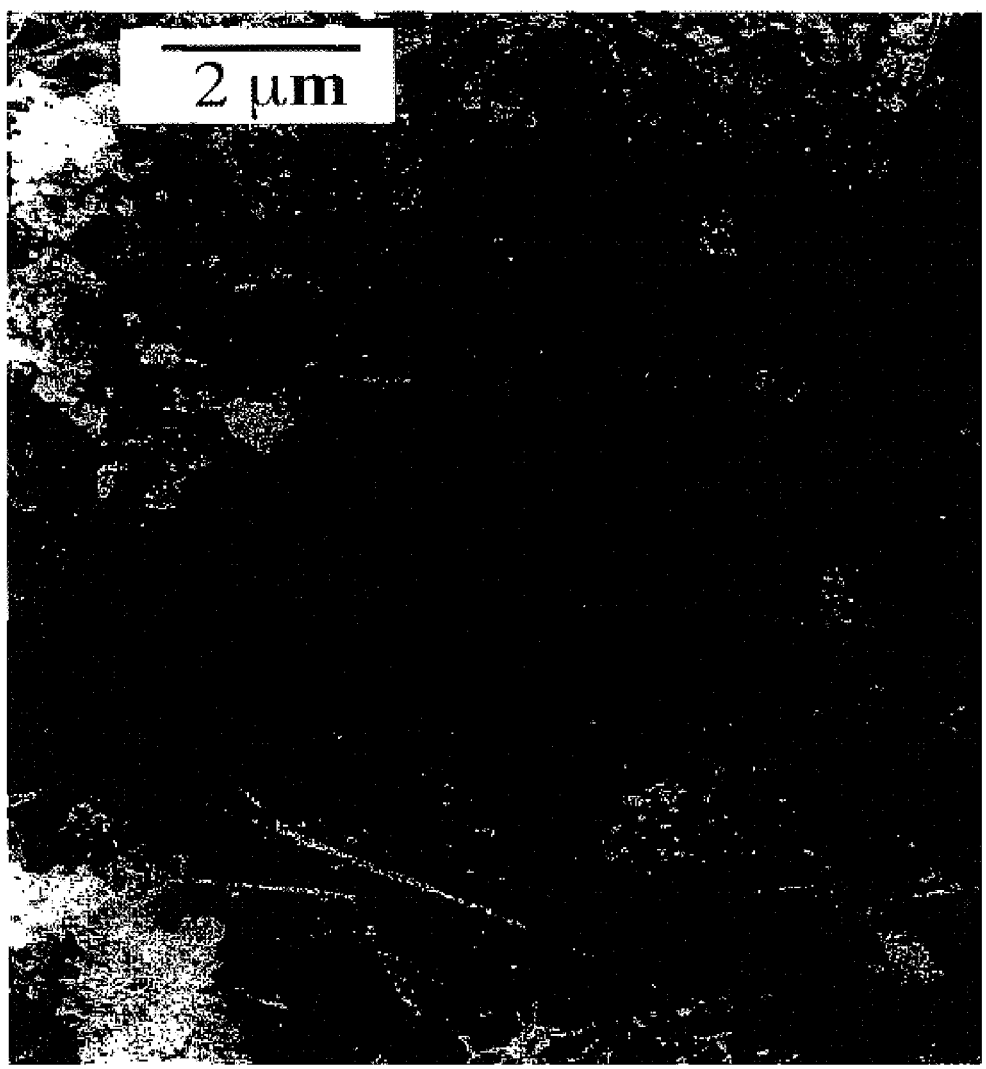
FIG. 1(A–D) shows micrographs of products made when annealing activated fullerene soot with amorphous boron at 2200° C.: 1A, Scanning electron microscopy (SEM) micrograph showing nanotubes and nanotube bundles; 1B, Transmission electron microscopy (TEM) micrograph of a nanotube tip showing incomplete closing of the nanotube tip; 1C, TEM micrograph of a nanotube with its inner shells closed off; 1D, TEM micrograph of polyhedral graphitic particles.
Figure 1B:
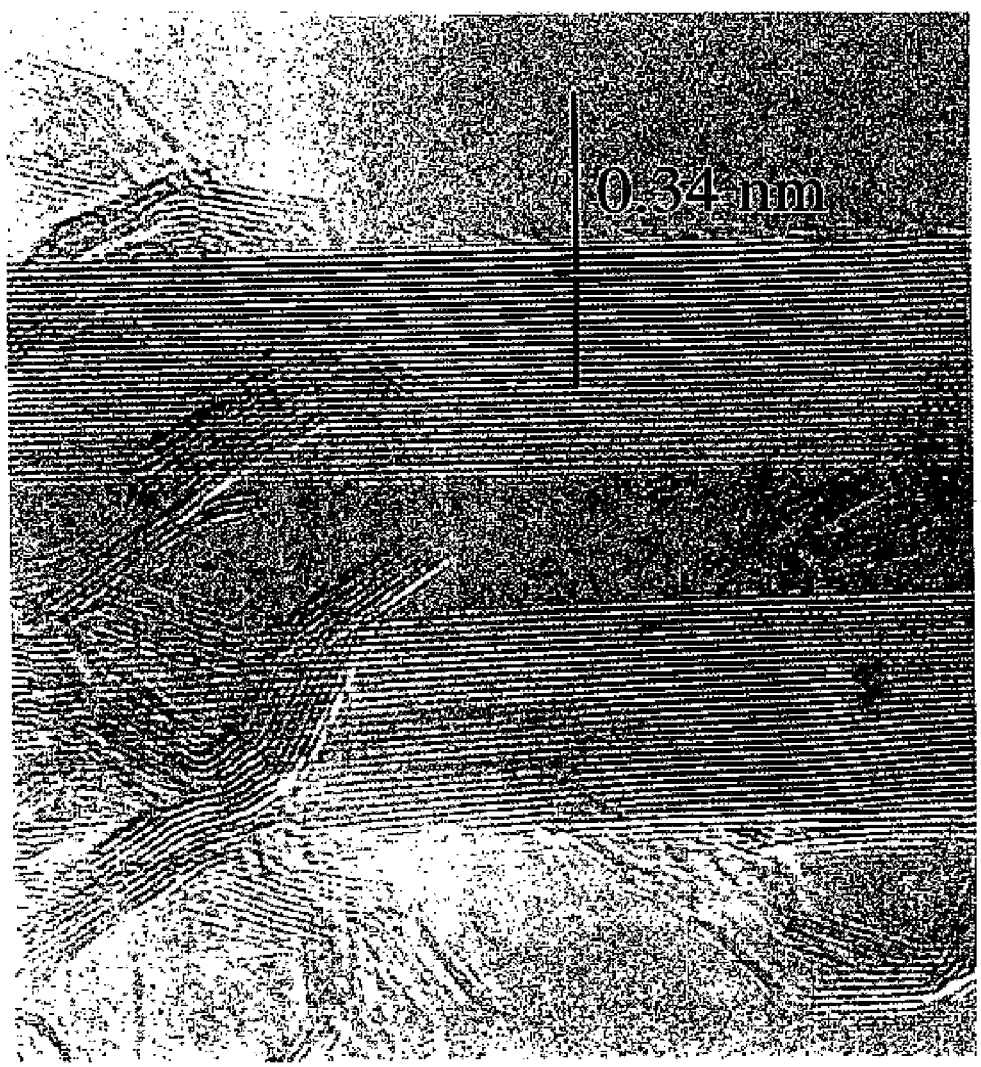

High resolution micrographs (FIGS. 1B and 1C) show that the tubes of example 1 made using boron were similar to multiwalled nanotubes made using an arc discharge, with occasional kinks in the nanotube (FIG. 1C). However, some nanotube ends were not completely closed and had disordered carbon around the tip (FIG. 1B). The disordered carbon at the tip indicates that growth was frozen either when the furnace was cooling or when the local carbon supply was exhausted. The inner shells of nanotubes were occasionally closed off, as in some nanotubes produced in an arc discharge (FIG. 1C). Polyhedral graphitic nanoparticles were the majority of the products (FIG. 1A).

Example 3

Figure 2A:
FIG. 2(A–B) shows TEM micrographs of the products made when annealing other carbon materials with boron to 2200° C.: 2A, twisted and tangled graphitic layers made when annealing carbon black with boron; and 2B, large closed carbon particles made when annealing ball milled carbon and boron.
Figure 2B:
Figure 3A:
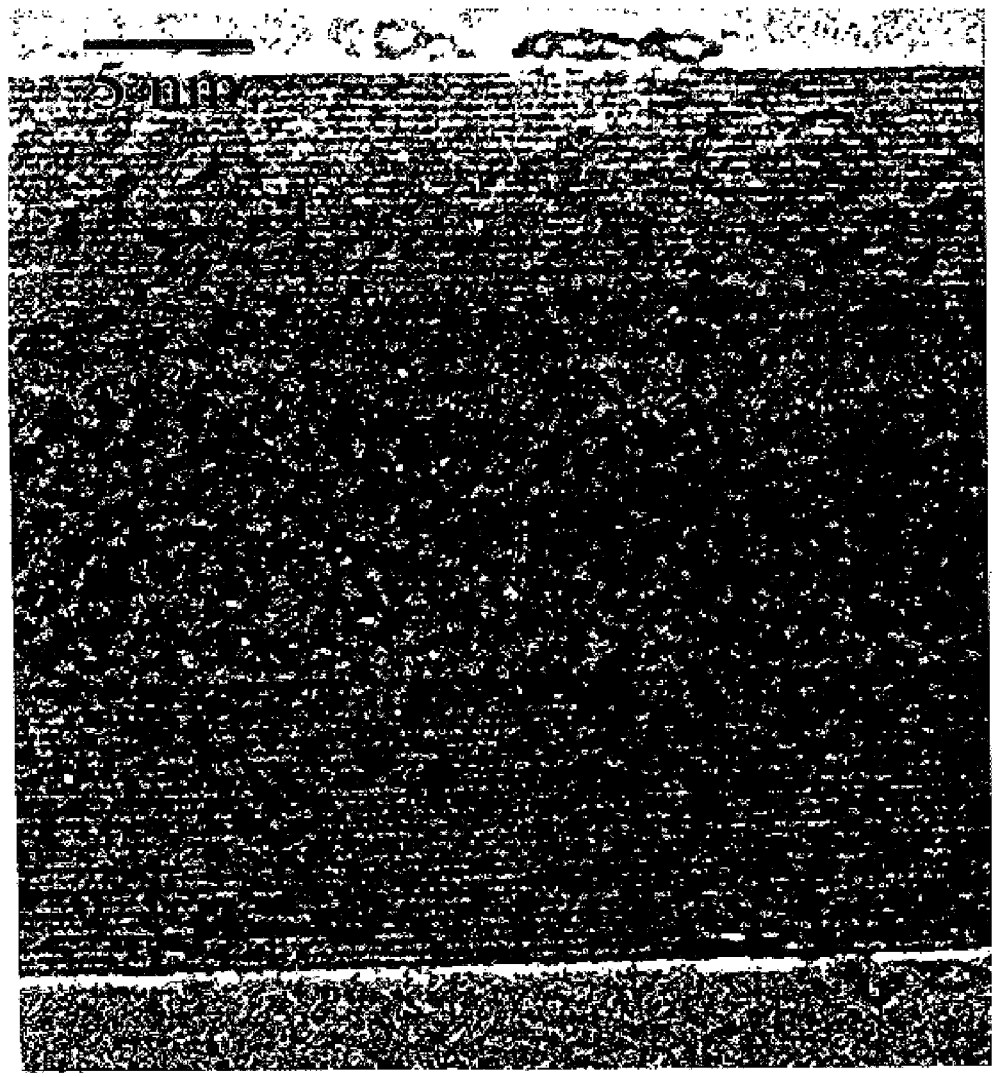
FIG. 3(A–B) shows, graphically, products made when annealing a sucrose carbon with boron to 2200° C.: 3A, TEM micrograph of an open ended nanotube; and 3B, TEM micrograph of a one nanotube possibly attached to a larger graphitic particle and another nanotube with numerous inner compartments.
Figure 3B:
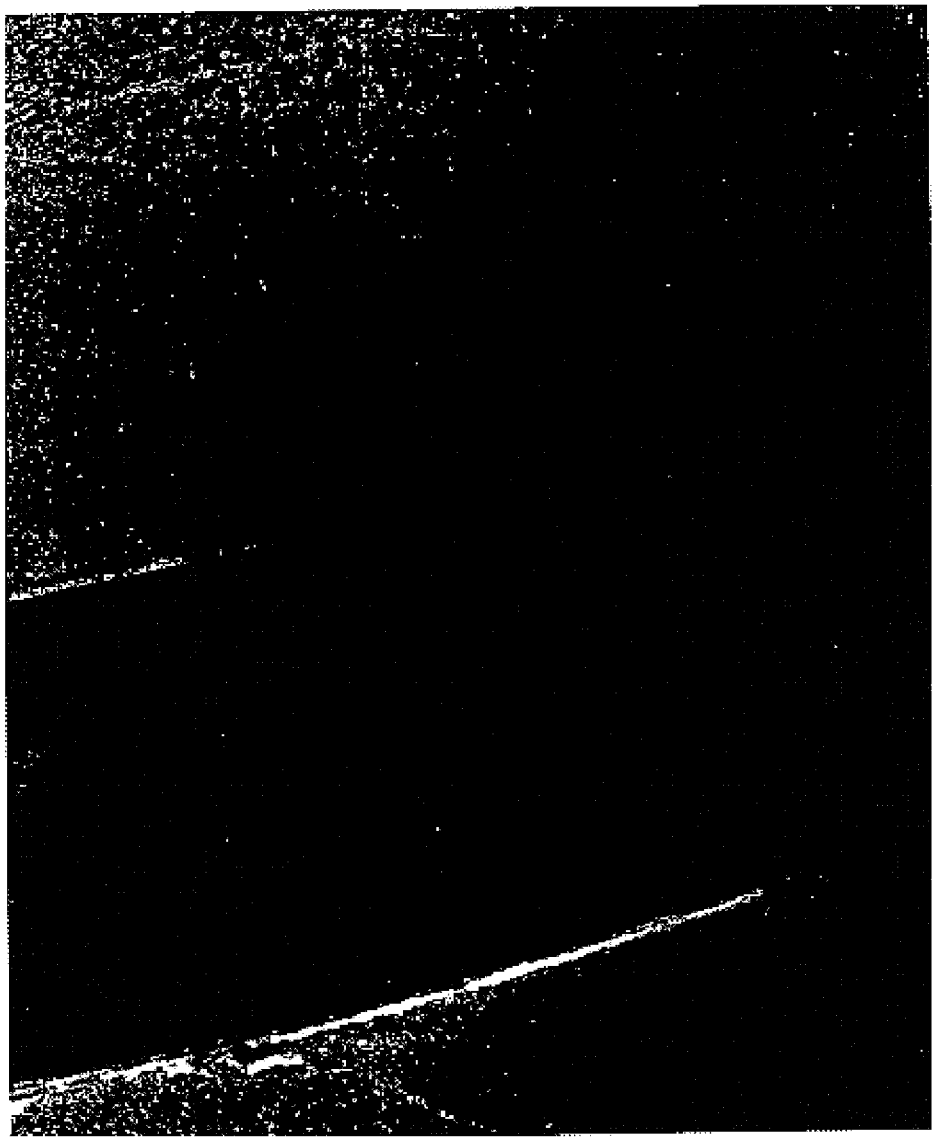

The applicability of this invention was extended to other disordered carbon materials: for example, ball milled graphite and sucrose carbon. While heat treatment of ball milled graphite with boron (FIG. 2) did not produce any nanotubes (only bent and tangled graphitic sheets and closed particles are found), annealing sucrose carbon with boron does produced multiwalled carbon nanotubes (FIG. 3). Open nanotubes were also seen in these experiments (FIG. 3A). The overall yield of nanotubes when annealing sucrose carbon was low. These experiments show that it is possible to make nanotubes by controlling the heat treatment of common and inexpensive organic materials. Also, some nanotubes might be attached to graphitic particles as shown in FIG. 3B. These larger graphitic particles might act as nucleation sites for nanotubes. However, if this were the case, every heat treatment sample should have nanotubes because after heat treatment all samples had similar graphitic particles. Consequently, it is believed that the presence of larger graphitic particles does not influence the nucleation of these nanotubes.

There were no significant sources of carbon vapor in these experiments, because the annealing temperature was kept well below the sublimation point for carbon (>3000 K). Consequently, it is unlikely that single carbon atoms, ions, or molecules directly lead to multiwalled nanotube growth, which is in direct contrast to many mechanisms known in the art for carbon nanotube growth.

One possibility is that boron or another such dopant could catalyze nanotube growth through a carbon dissolution and precipitation process through boron carbide nanoparticles. This is a common mechanism for the acceleration of graphitization in the presence of impurities and would be similar to catalytic processes to make nanotubes. However, if nanotubes were made by this process the starting structure of the carbon should not affect the yield of nanotubes.

Boron carbide ($B_4C$) was formed by the reaction of elemental boron with disordered carbon when T>1600° C., and it begins to decompose at T>2000° C. However, this mechanism should not be dependent upon the initial carbon material, only the dissolution and precipitation of carbon. As shown herein, the initial carbon material and its structure determine whether or not nanotubes are made.

In addition, it appears that the nanotubes prepared herein grow by an open-ended mechanism (FIGS. 1B and 3A), in contrast to nanotubes grown by catalytic and carbide decomposition methods. It is, therefore, believed that nanotubes were not made by a dissolution/precipitation process in these experiments, but rather that the structure of the starting carbon determined nanotube formation in a manner analogous to a graphitization process.

Even with the proper carbon source or precursor, processing conditions controlled or contributed to nanotube formation. If the role of boron or another dopant was to lower the temperature and/or accelerate the kinetics of the heat treatment, in light of one present invention it would be possible to otherwise manipulate the heat treatment of the present carbon materials to prepare nanotubes in good yield, usable quantities and without impurities. Presumably, the kinetics of this process would be quickened (in comparison to a typical furnace experiment) if the heating rate and ultimate heat treatment temperature were as high as possible.

Example 4

Other interactions can help keep the nanotubes open during growth. For example, there was some interaction found between the walls of some of the open nanotubes as shown in FIG. 3A. This could be interpreted as experimental evidence of the "lip-lip" interaction between the walls of a growing nanotube.

A key structural parameter in the disordered carbons that determined nanotube growth in these experiments was the presence of pentagons. Amorphous carbon produced by arc evaporation has been described as small hexagonal regions separated by pentagons and heptagons and the presence of pentagons in fullerene soot has been inferred through its chemical reactivity. It also has been proposed that pentagons may be present in non-graphitizable carbons, such as sucrose carbon and carbon black and that they are a defect that determines whether or not a carbon is graphitizable. Pentagons in a graphite sheet would allow it to curl up and form a nucleus for nanotube or nanoparticle growth. Upon formation of a nucleus, the process of agglomeration and ordering of hexagons and pentagons in non-graphitizable carbons led to formation of carbon nanotubes and polyhedral particles. The importance of pentagons explains the rarity of nanotubes in experiments with graphitizable carbons. There are variations in the nanotube yields for different non-graphitizable carbons. Presumably, this is due to changes in the structure (pentagon/hexagon/heptagon ratio) of the non-graphitizable carbon.

Figure 1D:

In processing these materials, extremely high temperatures or fast diffusers were necessary in order to facilitate carbon nanotube growth. This would lead to more diffusion and a wider and thicker nanotube/nanoparticle nucleus structure, which would tend to keep the nanotube open for growth. The incomplete formation of the tip as shown in FIGS. 1B and 3A indicated that these nanotubes were probably formed via an open-ended growth process. The tendency to form additional graphitic layers when the kinetics was enhanced was also seen in the polyhedral particles formed in experiments according to the present invention as shown in FIG. 1D. In general, the carbon nanotubes obtained by methods of the present invention were larger with thicker walls than those found when annealing pure fullerene soot at about 2400° C.

Example 5

Figure 5A:
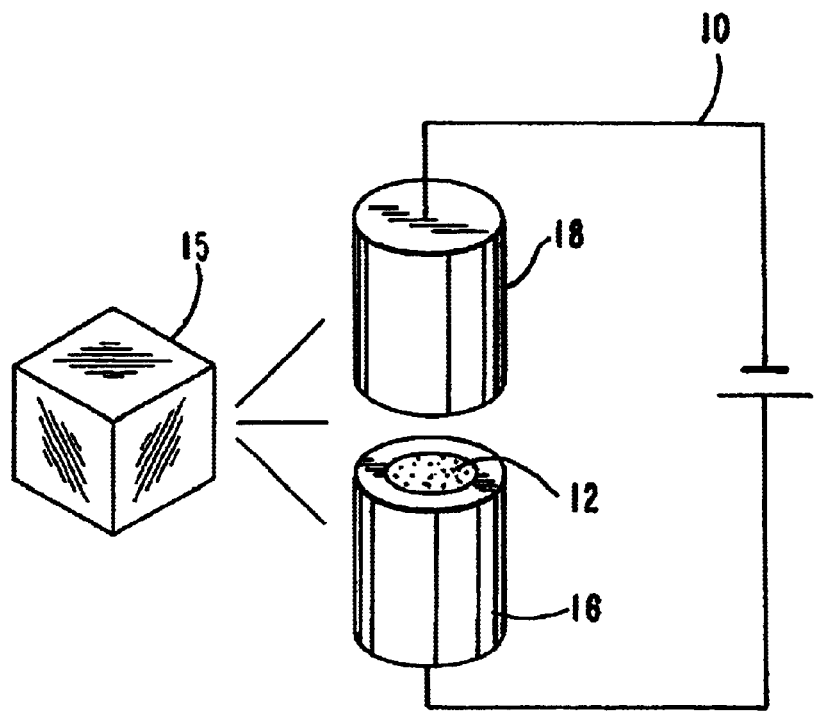
FIGS. 5A and 5B provide schematic representations of apparatus and/or equipment of the type useful with the methods of this invention.
Figure 5B:
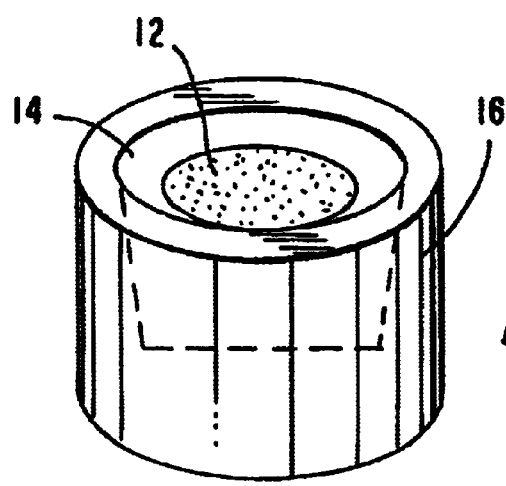
Figure 6A:
FIG. 6A shows micrographs of nanostructured product, in accordance with this invention, and more particularly as provided through the apparatus Example 7: 6A–L show, by increasing magnification, product formed in the anode recess and as lifted therein to show the various structural features and morphologies.
Figure 6B:
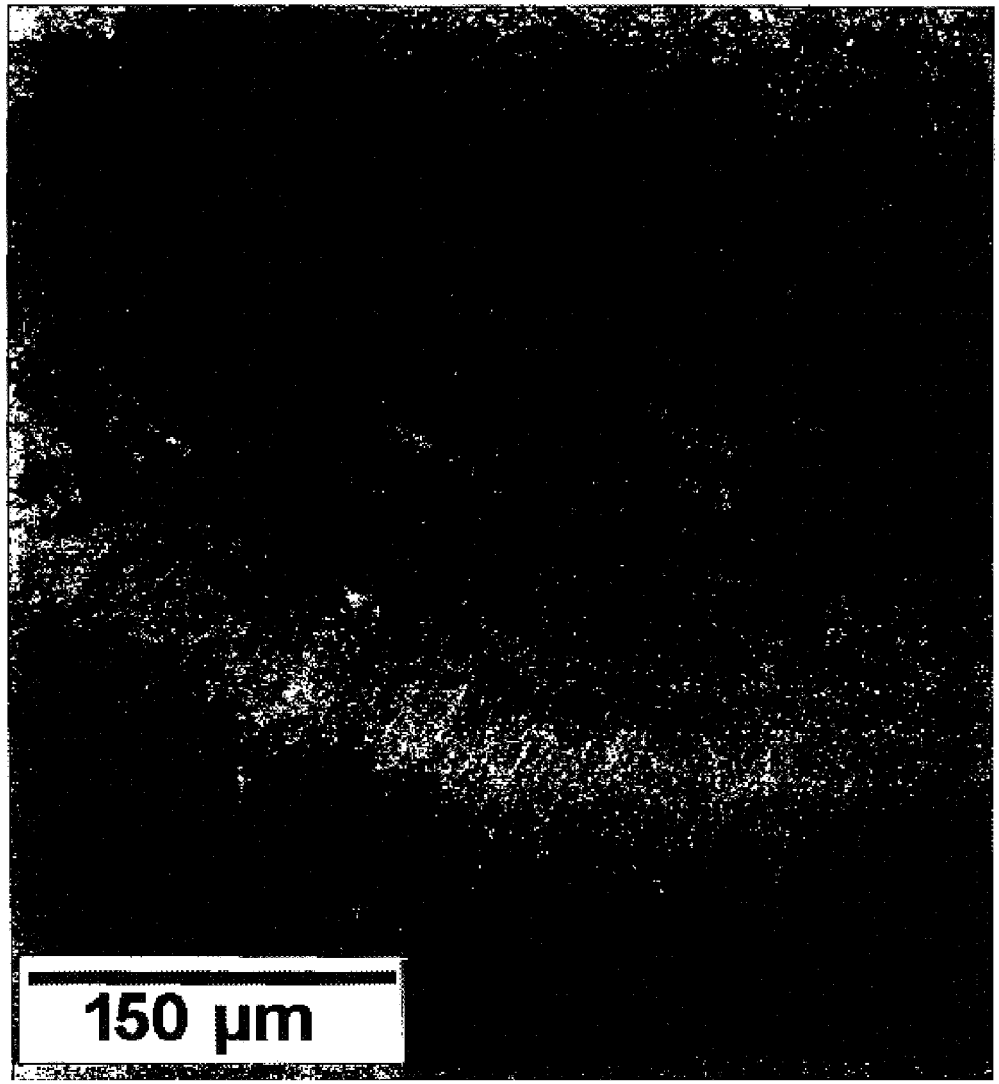
FIGS. 6I–6L, in particular, show the resulting carbon nanotubes in good detail.
Figure 6C:
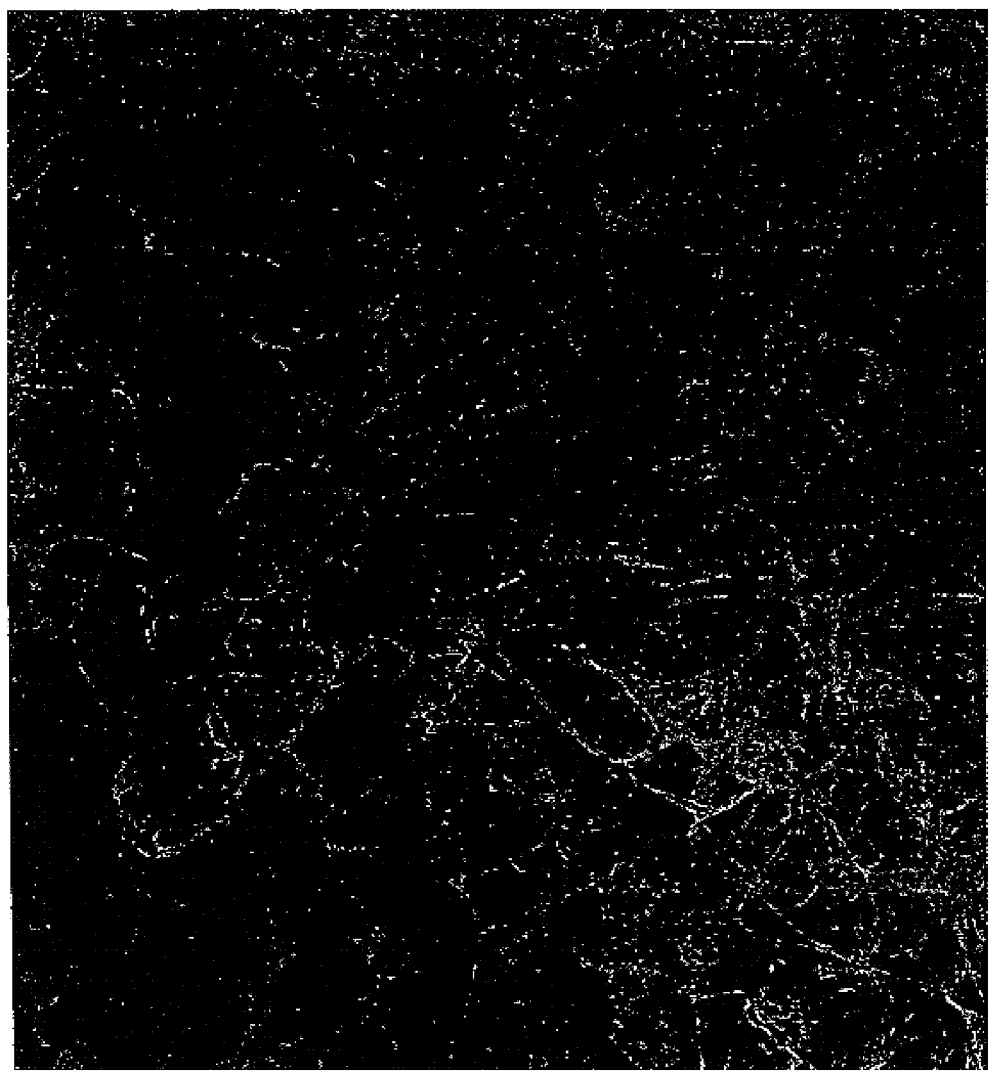
Figure 6D:
Figure 6E:
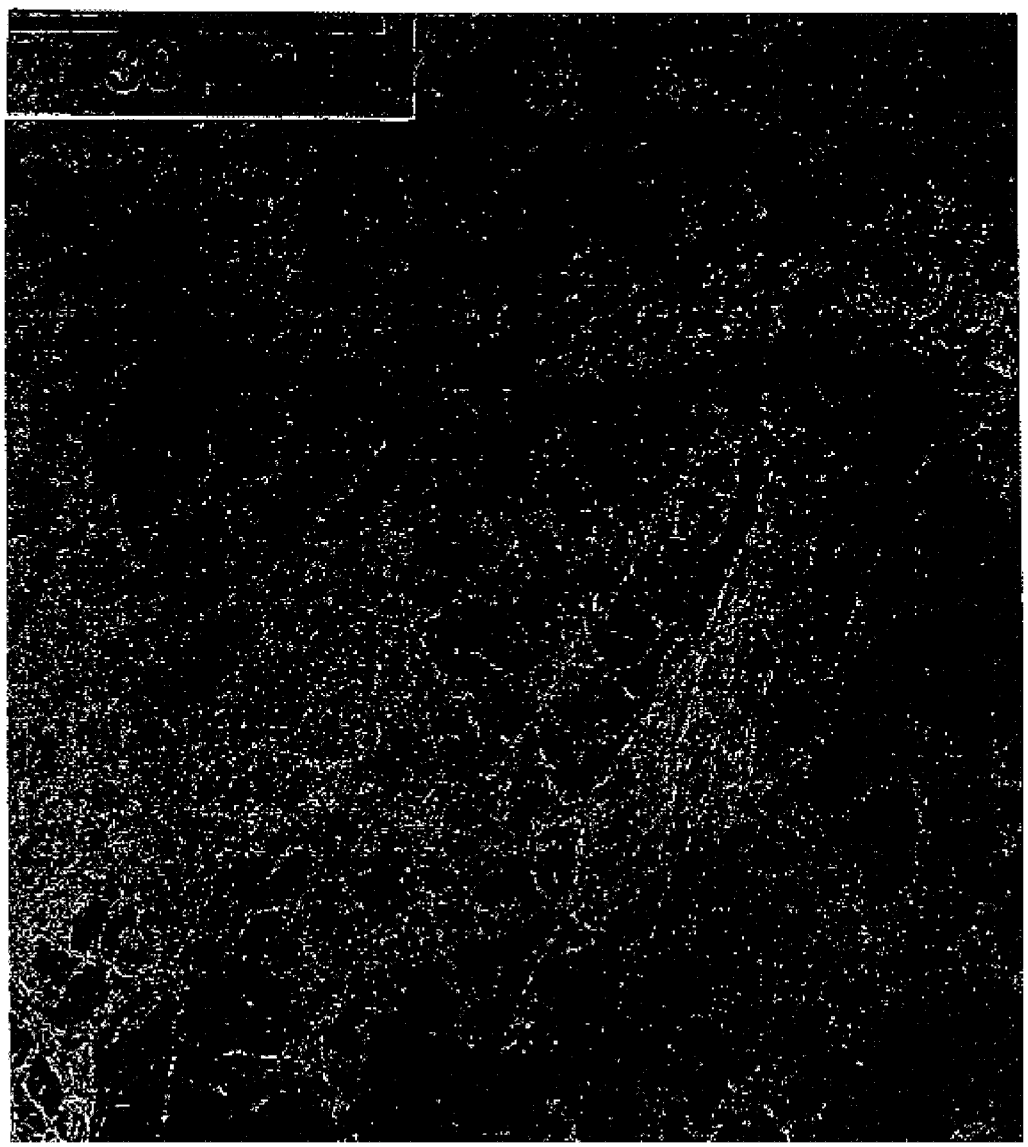
Figure 6F:
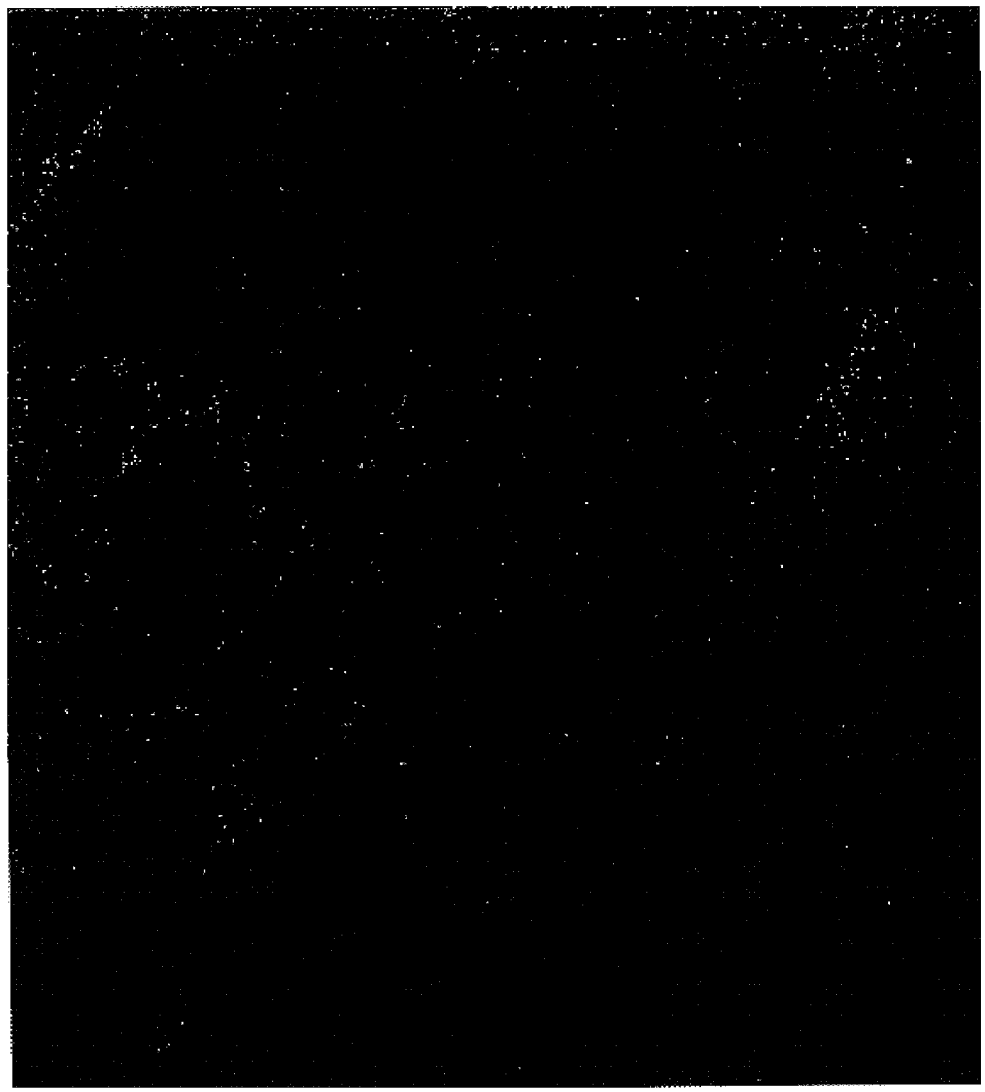
Figure 6G:
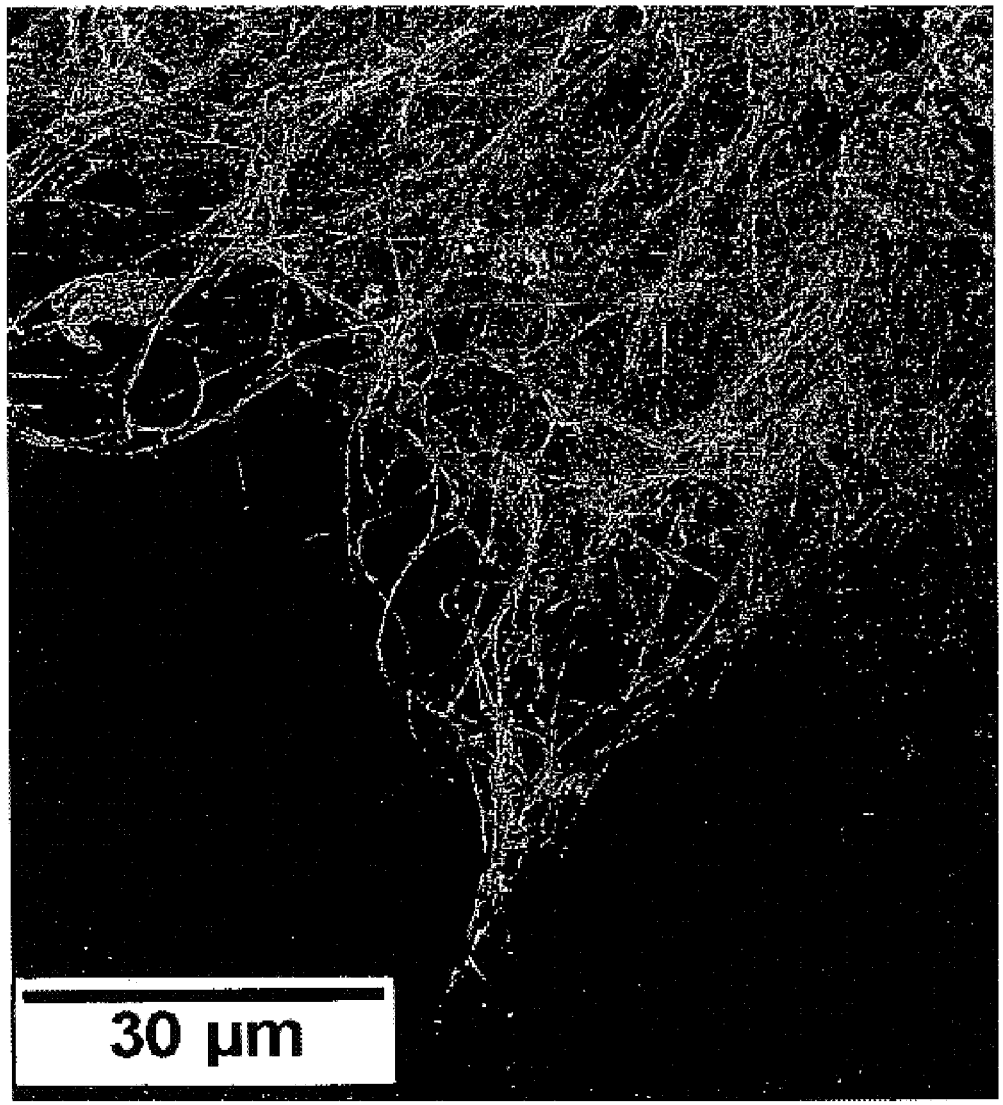
Figure 6H:
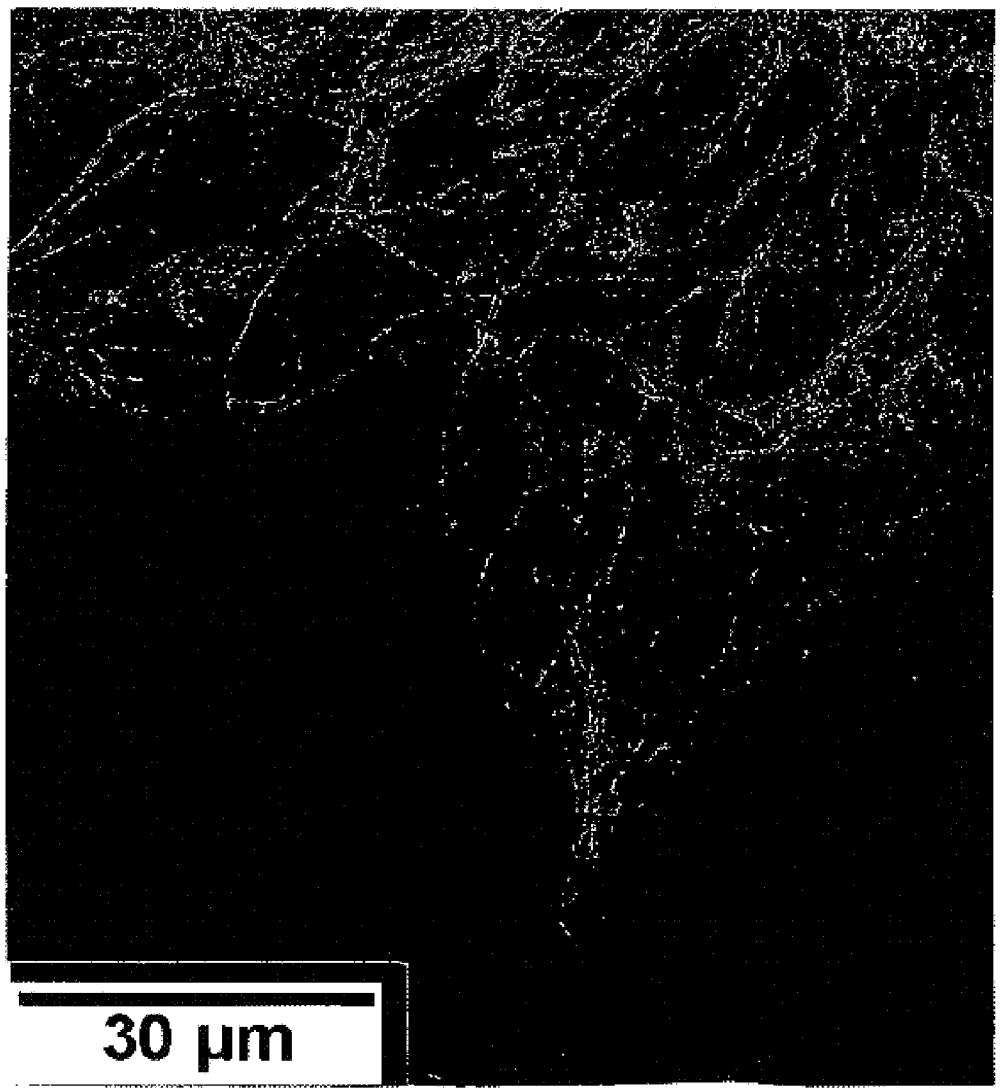
Figure 61:
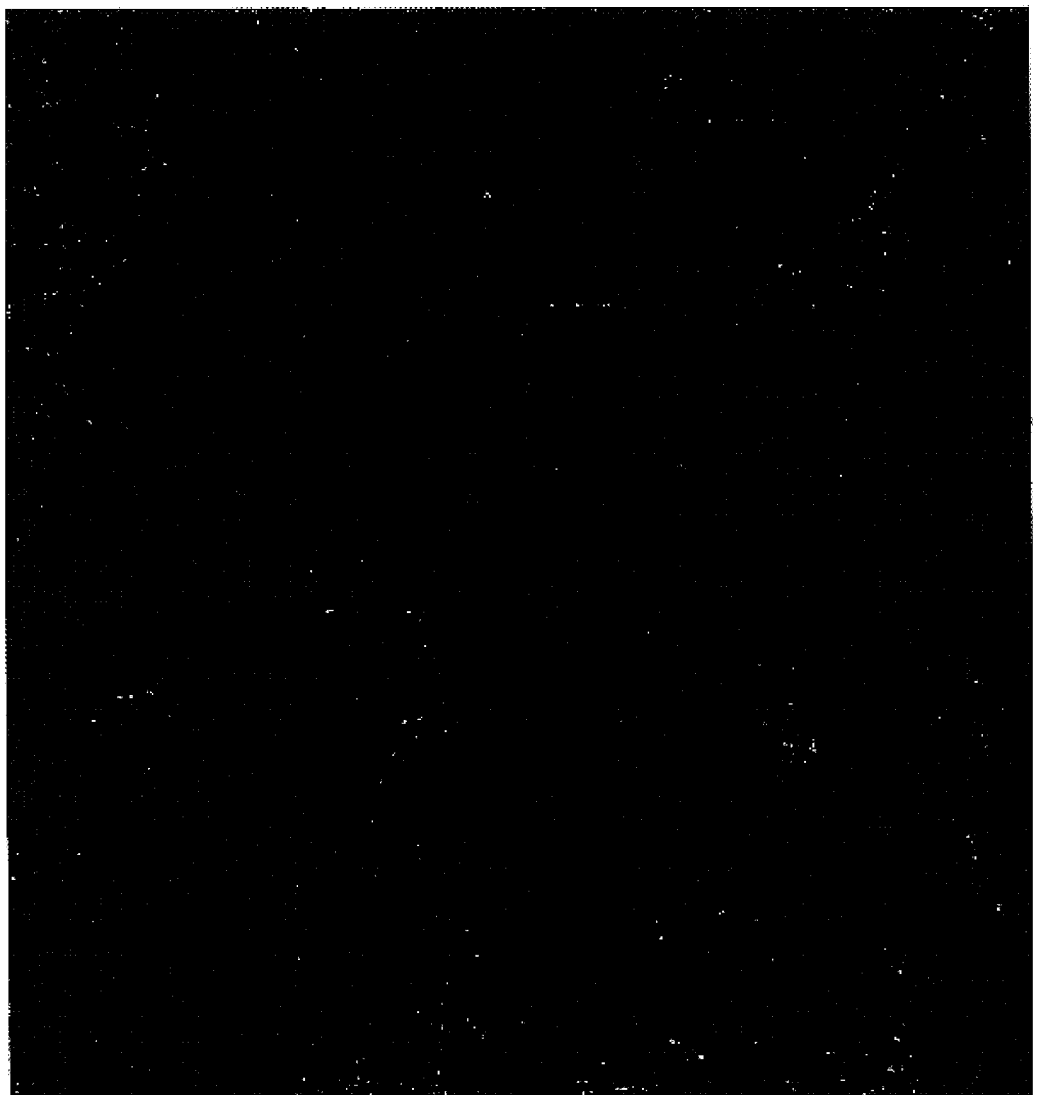
Figure 6J:
Figure 6K:
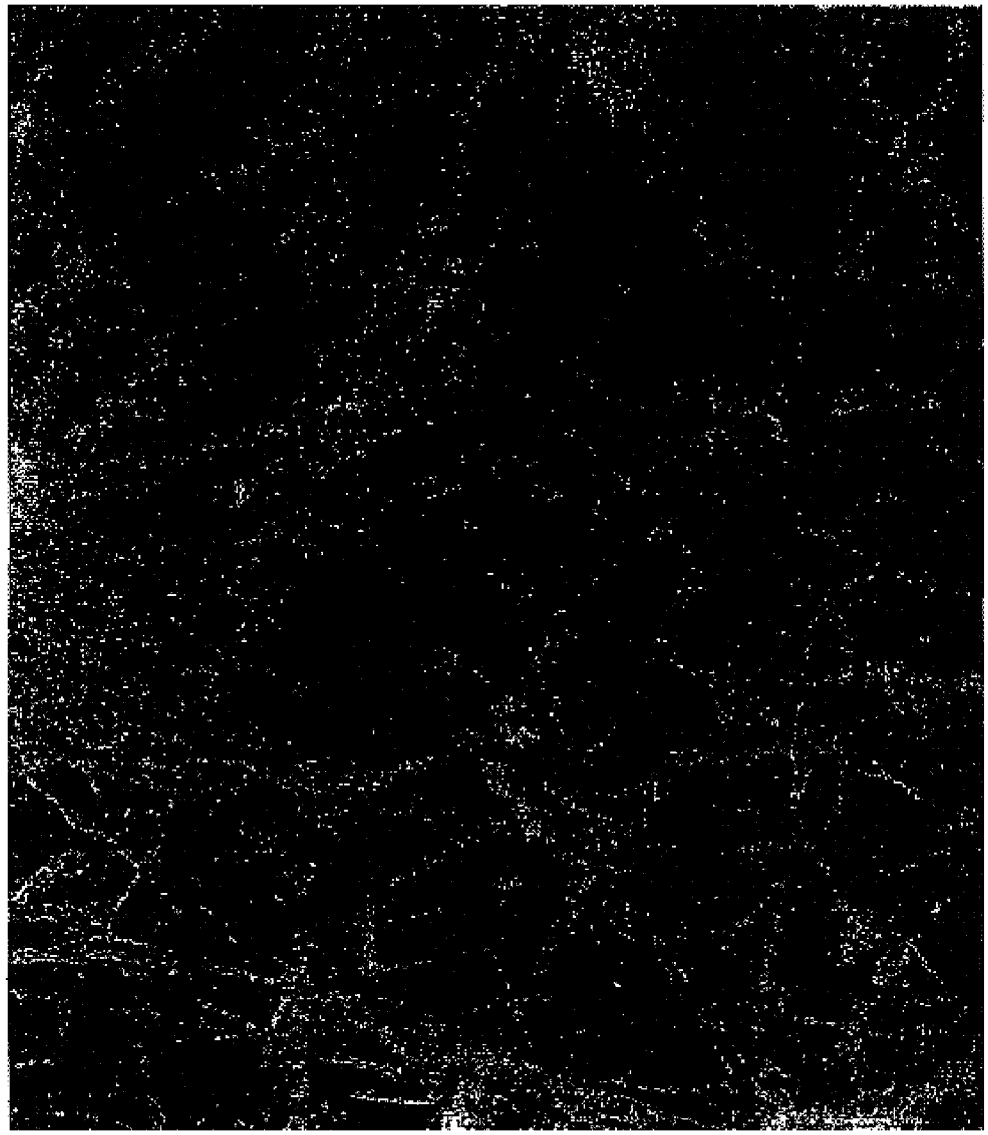
Figure 6L:
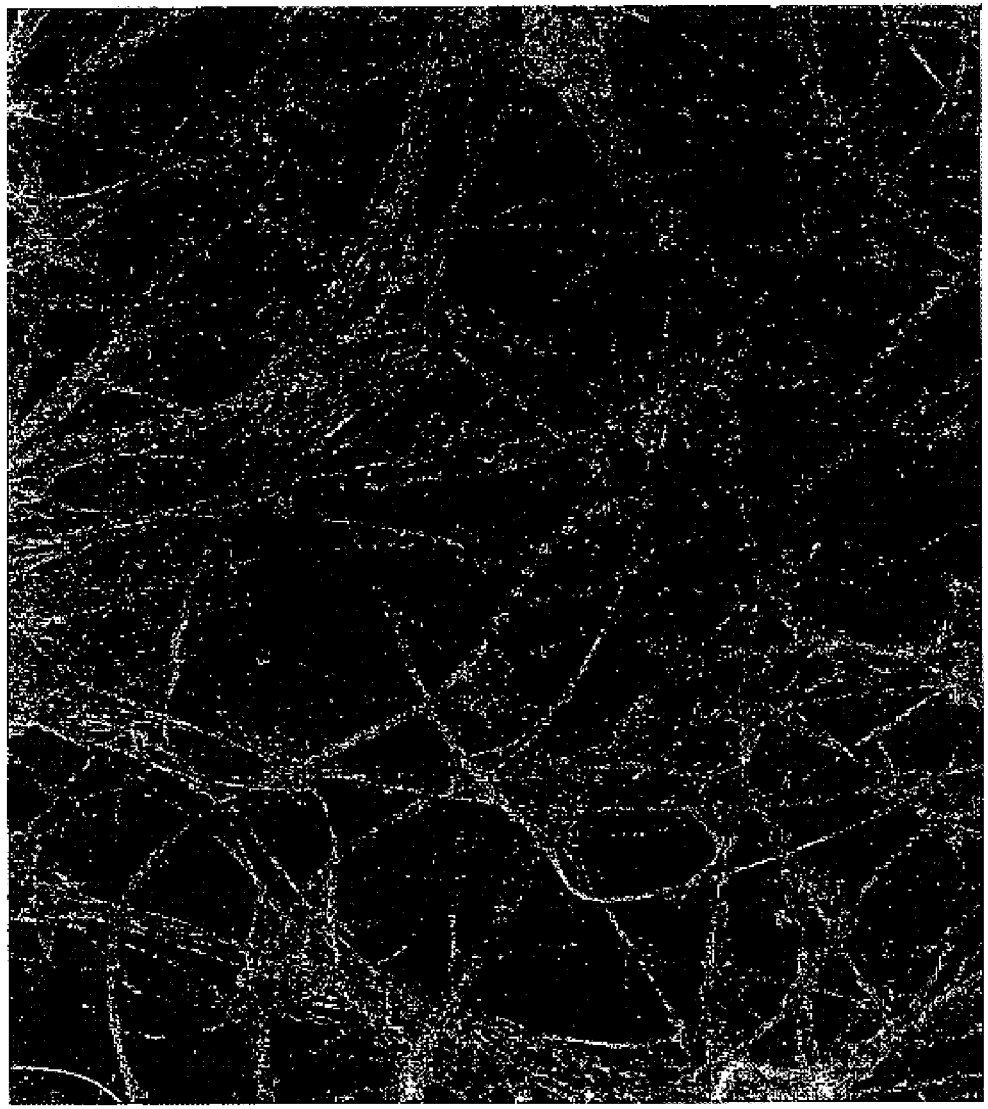

In this example, an arc discharge was used to fuel a furnace for annealing carbon materials at high temperature and ramp rates. Reference is made to FIGS. 5A–B. Cathode (18) was a water cooled Cu rod, and the graphite anode (16) was 1.0 cm in diameter had a 0.5 cm hole bored 0.5 cm deep into it with an appropriate carbon material (12) packed therein. An arc was struck (17–18 V, 100 A, and 4 minutes duration) under 100 Torr of He, which is quite different from the optimal pressure for nanotube deposit growth on the cathode. The resulting plasma can be used alone or in combination with a heat source (15) to effect the desired transformation. The center of the anode top was then analyzed by SEM and TEM.

Example 6

Figure 4A:
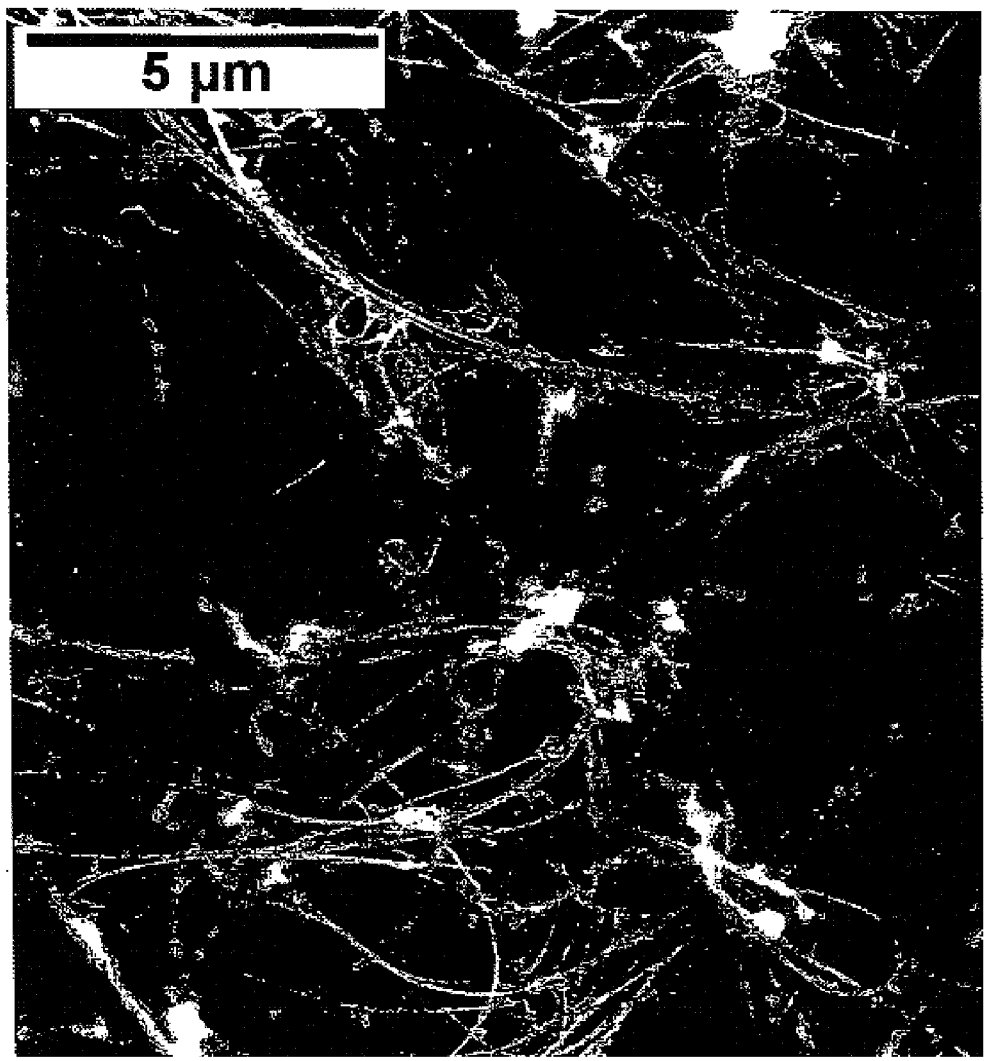
FIG. 4(A–D) shows micrographs of products made by annealing carbon materials with an arc furnace: 4A, SEM micrograph of nanotubes and nanotube bundles made using activated fullerene soot; 4B, High resolution TEM micrograph of a multiwalled nanotube made using activated fullerene soot; 4C, SEM micrograph of nanotubes and nanotube bundles made using carbon black; and 4D, SEM micrograph of annealed graphite powder.
Figure 4B:
Figure 4C:
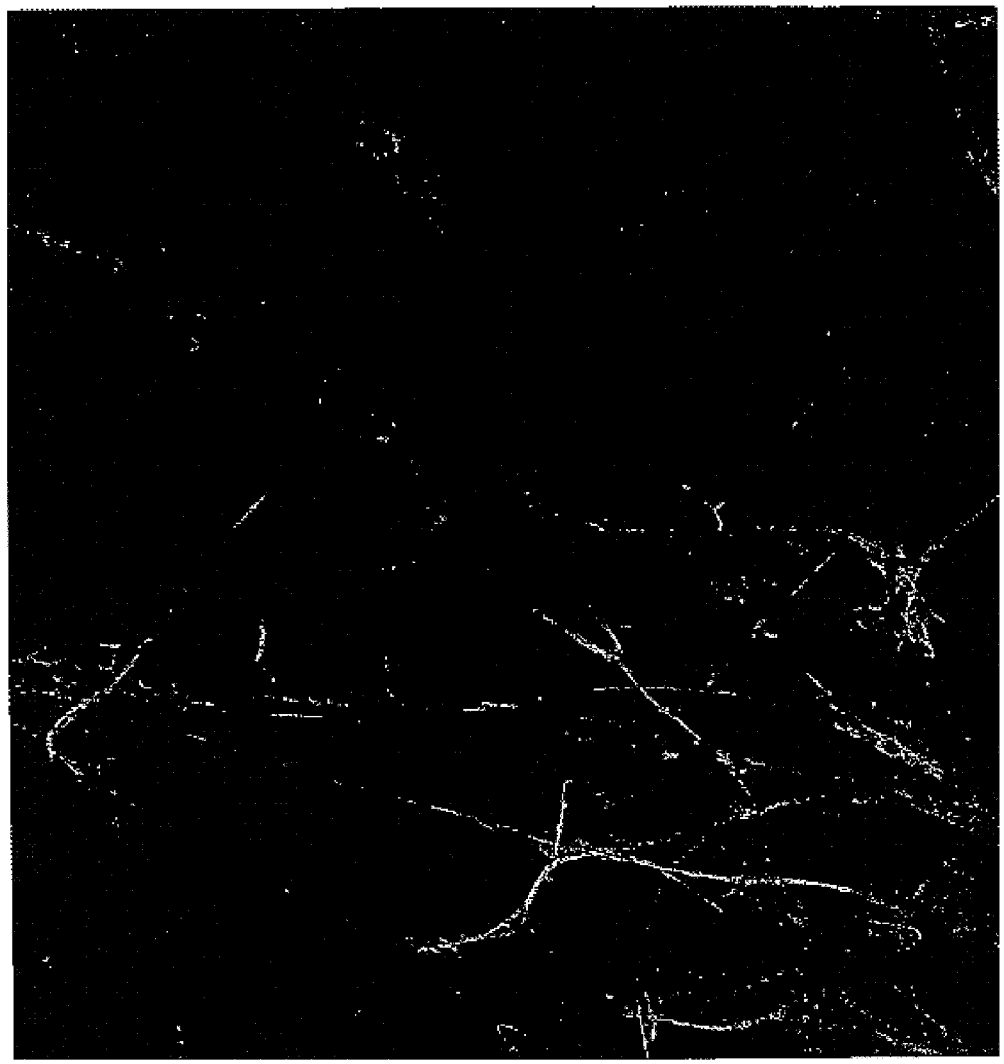
Figure 4D:
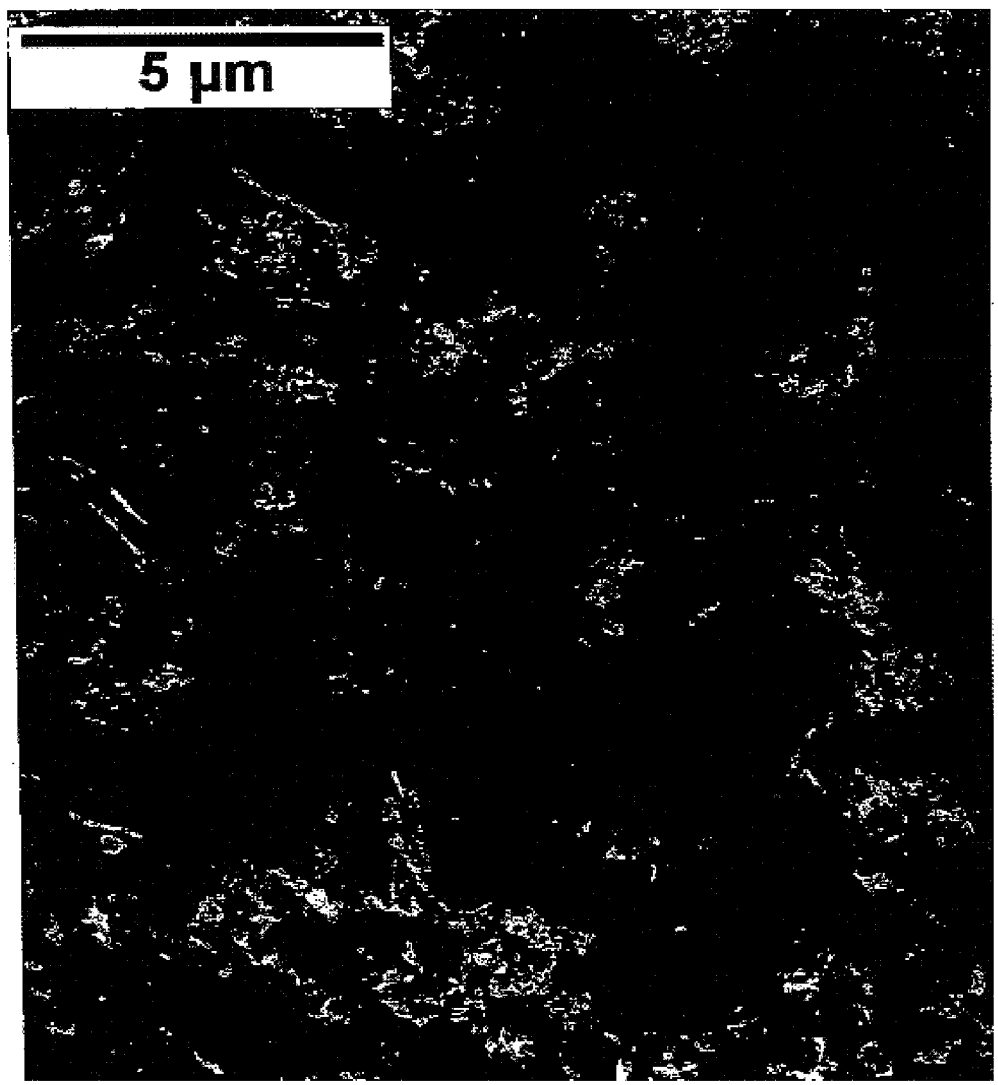

When fullerene soot, without any added boron was treated using the furnace of the preceding example, the products were multiwalled carbon nanotubes and nanoparticles as shown in FIGS. 4A and B. This method of making carbon nanotubes was also extended to other non-graphitizable carbons such as carbon black as illustrated in FIG. 4C. In contrast, when annealing graphitizable carbons such as polyvinyl chloride carbon or graphite powder, carbon nanotubes were generally not found in the center of the anode as shown in FIG. 4D. Again, the dependence upon the starting carbon material suggests the formation of nanotubes is analogous to a graphitization process.

Example 7

Using apparatus (10) of the type illustrated in FIG. 5B, a suitable amount of carbon black (12) was positioned in the recess (14) of a graphite anode (16). After several minutes, under appropriate conditions (~20 V, 100 A, 1–760 Torr of He), several milligrams of nanostructured material were produced, as characterized elsewhere herein, and as shown micrographically in FIGS. 6A–6L. A fold of the resulting material was lifted as shown in FIGS. 6A–6D to reveal various structural features. Increasing magnification in FIG. 6 shows the fine, tubular morphology.

Example 8

Figure 7:
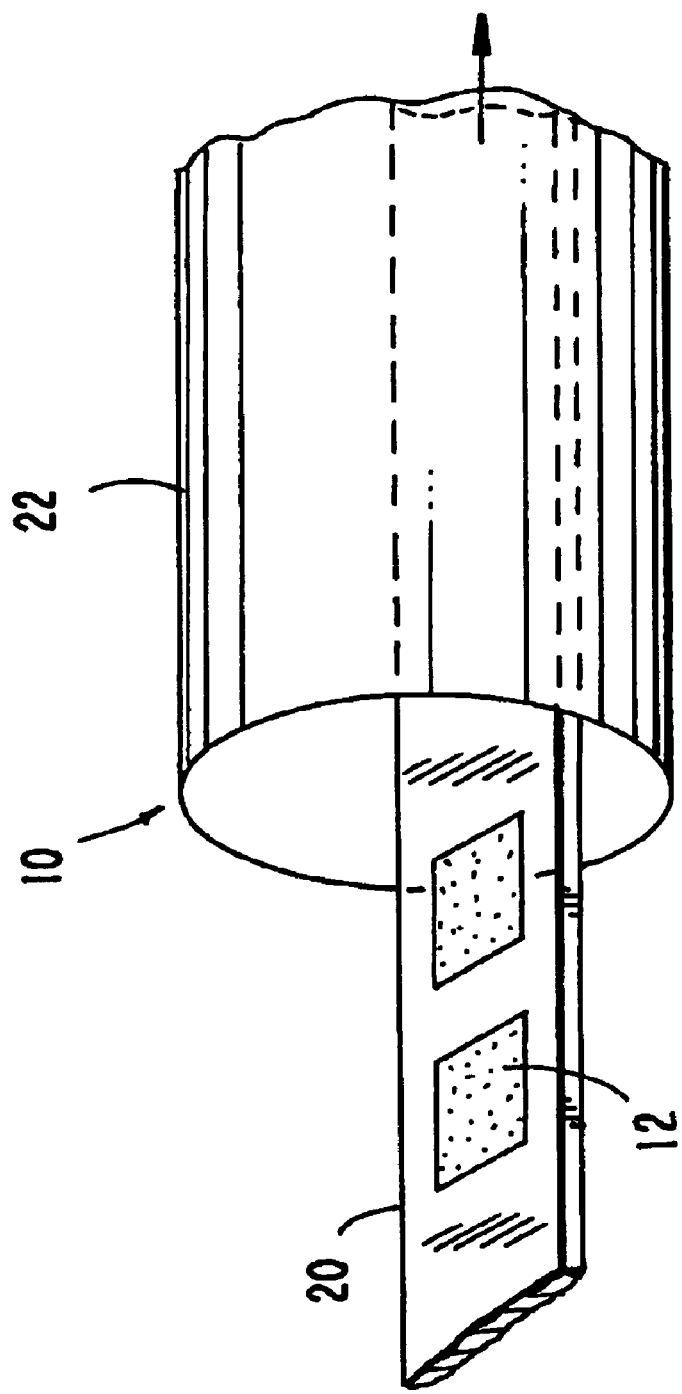
FIG. 7 is a schematic representation of a system, as further discussed in Example 8, which can be used with the continuous or semi-continuous production of carbon nanotubes and/or related structures, as otherwise described herein and in accordance with this invention.

With reference to apparatus (10) illustrated in FIG. 7, the production of carbon nanotubes could be scaled up to provide kilogram quantities, given 1 gram production using a 1-inch diameter surface, over a 24-hour period. An array of such anode/carbon starting material configurations (20) can be sequentially positioned relative to a suitably-dimensioned cathode structure (i.e., 18 or 22). Repetitious arc discharges can provide the energy required for the desired production. Various other electrode or equipment configurations can be employed, consistent with this invention and the methods described herein, so as to provide the energy necessary for the synthetic transformation. Such quantities can be used to further investigate the structure, properties and uses of these materials.

Example 9

Figure 10:
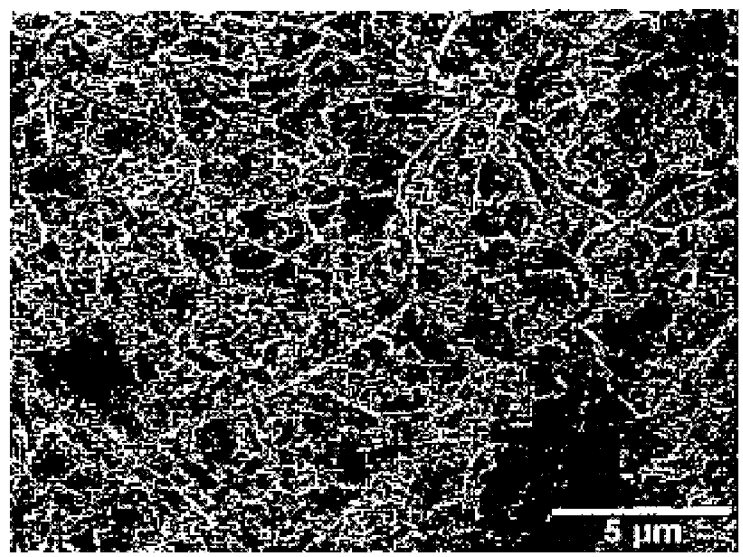
FIG. 10 shows a micrograph of a carbon nanotube layer obtained by using an arc-furnace having tungsten electrodes.

In this experiment, the arc furnace had a pair of electrodes made from tungsten, which has a melting temperature of 3410° C. The cathode side was made from a cylinder having 1 inch in diameter. The anode side was made from a similar cylinder, having 1 inch diameter with a hole of ¾ inch in diameters drilled to a depth of ¾ inch. This hole was then completely filled with carbon black for the process. FIG. 10 shows the carbon nanotubes formed from the carbon black in the anode cup after 1 minute of processing. The parameters used in this experiment were: He gas at 100 Torr, temperature about 3000° C., arc-furnace with a 100 A current and 19 V, process time was 1 minute.

Example 10

In this experiment, the same experimental conditions as those of Example 9 were followed, except that the helium gas was kept at atmospheric pressure. Carbon nanotubes formed as shown in FIG. 11. This experiment indicates that the apparatus of the present invention can be utilized in the absence of a vacuum pump.

Example 11 (Comparison Example)

Figure 12:
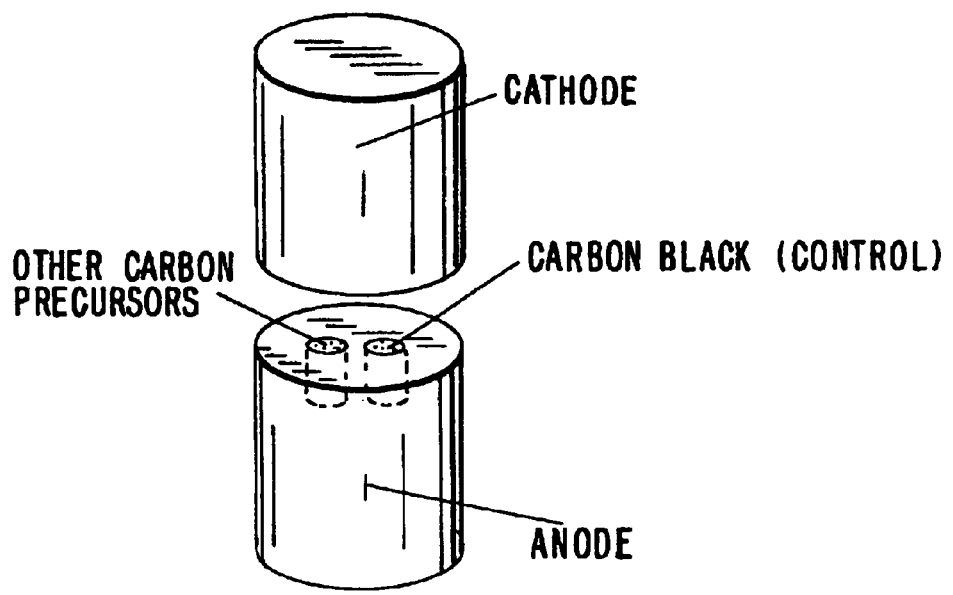
FIG. 12 is an arc-furnace wherein the anode electrode has two holes.
Figure 13:
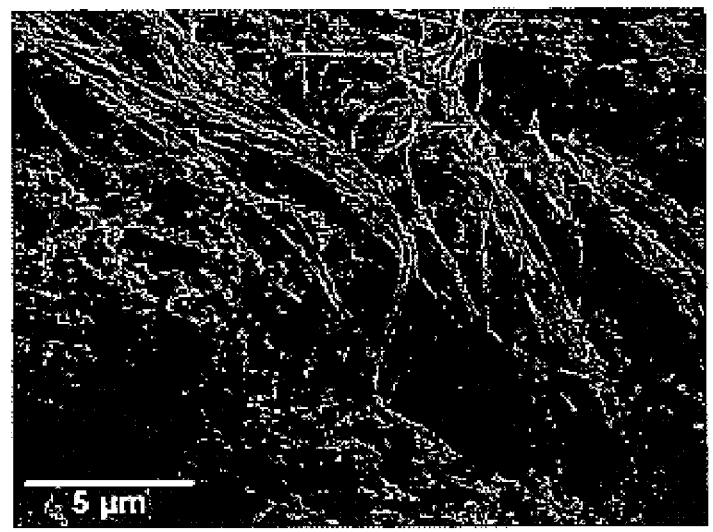
FIG. 13 is a micrograph of carbon nanotubes formed from PVC as carbon precursor.
Figure 14:
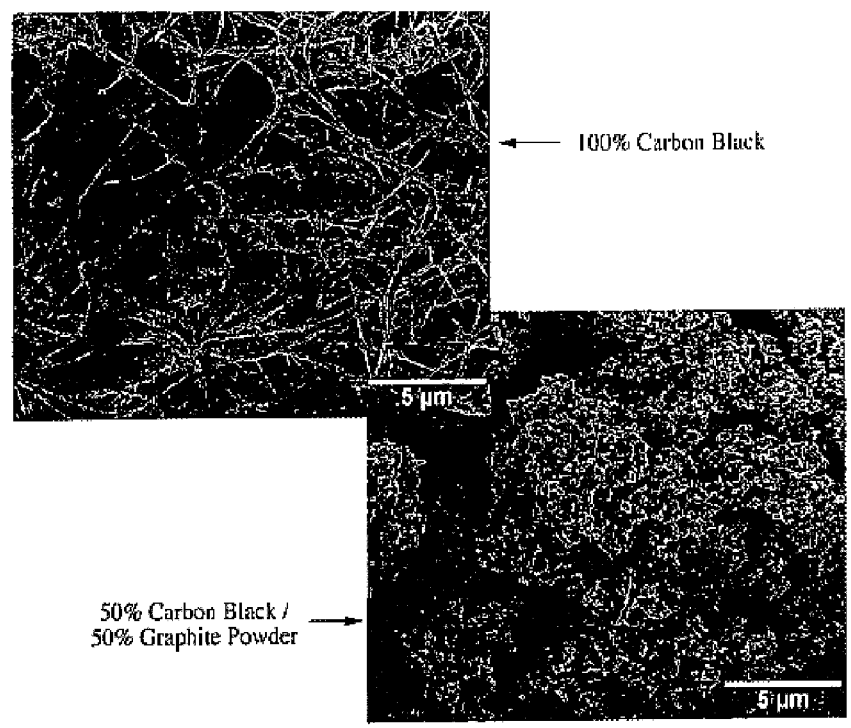
FIG. 14 shows micrographs of carbon nanotubes formed from a mixture of 50% carbon black and 50% graphite powder and 100% carbon black when subjected to the methods of the invention.

This experiment was conducted under the same experimental conditions as in Example 9 except that the anode had two holes each being approximately ¼ inch in diameter in diameter as shown in FIG. 12. One hole was filled with carbon black and the other with another carbon percursor, either graphitizable or non-graphitizable. Thus, experiments were conducted in which one hole of the anode was completely filled with carbon black and the other was filled with PVC in one run, pure graphite in a second run, and a mixture of 50% graphite and 50% carbon black in a third run. When PVC was used, carbon nanotubes were formed as shown in FIG. 13. When the experiment was conducted with graphite carbon nanotubes had been observed. When the experiment was conducted with the mixture of graphite and carbon black some carbon nanotubes were formed as shown in FIG. 14.

Example 12

In this experiment, the same experimental conditions as those of Example 10 were followed except that carbon black was used as the precursor with the pressure kept at atmospheric level by using helium or nitrogen gas. When the experiment was conducted in helium gas, a good concentration of carbon nanotubes was obtained as shown in FIG. 11. When the experiment was conducted using nitrogen gas, the yield of carbon nanotubes was somewhat lower. These results indicate that the methods of the present invention can be conducted by using an inexpensive gas such as nitrogen in the absence of a vacuum pump.

The preceding examples show the utility of preparing multiwalled nanotubes through control of the heat treatment and pressure of carbon materials. By using dopants and/or hitting with charged electrons, the kinetics for the formation of carbon nanotubes from solid carbon precursors were considerably increased. This presents new possibilities to understand and control nanotube growth. These methods give insight into a range of possible growth mechanisms and precursors for multiwalled carbon nanotube syntheses, and the mass production of carbon nanotubes.

While the principles of this invention have been described in connection with specific embodiments, it should be understood clearly that these descriptions, along with the chosen figures and data, are made only by way of example and are not intended to limit the scope of this invention, in any manner. Various other apparatus and/or equipment configurations could be used to effect the methodology described herein. Likewise, various other carbon sources, consistent with this invention, can be used with comparable benefit. Other advantages and features of this invention will be apparent to those skilled in the art, having been made aware of the information described herein, with the scope of the invention as further determined by reasonable equivalents thereto.

Thus, while we have described what are the preferred embodiments of the present invention, further changes and modifications can be made by those skilled in the art without departing from the true spirit of the invention, and it is intended to include all such changes and modifications as come within the scope of the claims set forth below.

I claim:

1. A method for forming tubular carbon nanostructures which comprises heating a non-graphitizable carbon precursor received within an electrical discharge between a cathode and an anode in an arc furnace in the presence of a gas at a temperature and a pressure sufficient to form the tubular carbon nanostructures from the carbon precursor wherein said carbon nanostructures are formed on said anode.

2. The method of claim 1, further comprising adding charged particles provided by an electrical discharge between a cathode, and an anode.

3. The method of claim 1, wherein the tubular carbon nanostructures include multi-walled carbon nanotubes.

4. The method of claim 1, which further comprises including a dopant in the non-graphitizable carbon precursor in an amount sufficient to form tubular carbon nanostructures.

5. The method of claim 1, wherein the temperature and pressure are maintained such that the sublimation of the non-graphitizable carbon precursor is minimized.

6. A method for forming tubular carbon nanostructures comprises the steps of heating a non-graphitizable carbon precursor in the presence of a gas at a temperature and pressure sufficient to form the tubular carbon nanostructures from the carbon precursor and including a dopant in the non-graphitizable carbon precursor in an amount sufficient to form the tubular carbon nanostructures, wherein the dopant is amorphous boron which is present in an amount sufficient to increase the length of the tubular carbon nanostructures to greater than 0.5 microns.

7. The method of claim 1, wherein the inert gas is helium, the non-graphitizable carbon precursor is fullerene soot, carbon black, or sucrose carbon.

8. The method of claim 1, wherein the transformation of the precursor is conducted in the absence of any significant sources of carbon vapor.

9. The method of claim 1, which further comprises controlling the arc furnace temperature and the heating rate of the precursor to form multi-walled carbon nanotubes.

10. A method of forming tubular carbon nanostructures which comprises discharging a direct current arc between an anode and a cathode, the anode comprising a conducting electrode containing a carbon precursor, the discharging in the presence of a gas at a temperature and pressure such that the carbon precursor is maintained in a solid phase and for a period of time sufficient to form the tubular carbon nanostructures on the anode from the carbon precursor.

11. The method of claim 10, wherein the carbon precursor is non-graphitizable carbon.

12. The method of claim 11, wherein the non-graphitizable carbon is fullerene soot, carbon black, or sucrose carbon.

13. The method of claim 10, wherein the carbon precursor is graphitizable carbon.

14. The method of claim 13, wherein the graphitizable carbon is PVC.

15. The method of claim 10, wherein the pressure is from about 50 Torr to atmospheric.

16. The method of claim 10, wherein the temperature is in a range from about 1500° C. to about 3500° C.

17. The method of claim 10, wherein the gas is an inert gas or nitrogen.

18. The method of claim 10, wherein the temperature and pressure are maintained such that the sublimation of said carbon precursor is prevented.

19. The method of claim 10, which further comprises including a dopant in the carbon precursor in an amount sufficient to form tubular carbon nanotubes.

20. The method of claim 10, wherein the formation of the tubular carbon nanostructures is conducted in the absence of any significant sources of carbon vapor.

21. An arc furnace for forming tubular carbon nanostructures comprising a cathode, an anode opposite the cathode, sources of voltage and current in amounts sufficient to create charged particles and produce an arc between the anode and cathode, a source of a gas to surround the arc, and a source of carbon precursor positioned adjacent the anode and within the arc, wherein the arc has a sufficiently high temperature and is maintained at a pressure for a time sufficient to heat the carbon precursor to form carbon nanotube on the anode.

22. The apparatus of claim 21, wherein the anode includes a recess of sufficient size and sufficient geometry to retain the carbon precursor therein, with the recess positioned on the anode positioned to receive the charged particles from the arc.

23. The apparatus of claim 22, wherein the carbon precursor is a disordered or non-graphitizable carbon, the cathode comprises a water-cooled metal rod.

24. The apparatus of claim 21, wherein the gas is an inert gas or nitrogen.

25. The apparatus of claim 21, wherein the source of carbon precursor is maintained upon a platform positioned within the arc and adjacent the anode, with the platform optionally including a surface which envelopes the platform to retain the precursor therein.

26. The apparatus of claim 25, wherein the anode is a platform for receiving the source of carbon precursor, the platform optionally positioned into an enveloping structure.

27. The apparatus of claim 26, wherein the platform is movable through the enveloping structure.

28. The apparatus of claim 25, which further comprises a conveyor for moving the platform and precursor through the arc to continuously form the nanostructures.

29. The apparatus of claim 25, wherein the voltage and current are sequentially applied to the platform to continuously or semicontinuously form the carbon nanostructures.

30. The apparatus of claim 21, which further comprises a heat source to increase the temperature of the arc to assist in formation of the tubular carbon nanostructures, wherein the temperature and pressure are maintained such that the sublimation of the disordered carbon precursor is avoided during the formation of the tubular carbon nanostructures.

31. The apparatus of claim 21, wherein the anode and the cathode are hollow tubes adapted to receive the source of carbon precursor through the tubes for a period of time sufficient to form carbon nanotubes.

32. The apparatus of claim 21, wherein the anode includes a circular platform having radial ribs, spaces therebetween for receiving the carbon precursor and a recess for collecting the carbon nanotubes.

33. The apparatus of claim 21, wherein the anode includes a circular platform rotatably attached to the anode, the platform including a location for the carbon precursor and a recess for collecting the carbon nanotubes.

* * * * *